United States Patent
Mathieu et al.

(10) Patent No.: US 10,824,903 B2
(45) Date of Patent: Nov. 3, 2020

(54) DEEP MULTI-SCALE VIDEO PREDICTION

(71) Applicant: Facebook, Inc., Menlo Park, CA (US)

(72) Inventors: Michael Fabien Mathieu, New York, NY (US); Camille Couprie, Montgeron (FR); Yann Andre Le Cun, Rumson, NJ (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/550,774

(22) Filed: Aug. 26, 2019

(65) Prior Publication Data

US 2019/0377974 A1 Dec. 12, 2019

Related U.S. Application Data

(63) Continuation of application No. 15/814,782, filed on Nov. 16, 2017, now Pat. No. 10,430,685.

(Continued)

(51) Int. Cl.
*G06K 9/62* (2006.01)
*G06N 7/00* (2006.01)
*G06K 9/00* (2006.01)
*G06K 9/46* (2006.01)
*G06N 3/04* (2006.01)
*G06N 3/08* (2006.01)
*G06Q 50/00* (2012.01)

(52) U.S. Cl.
CPC ....... *G06K 9/6212* (2013.01); *G06K 9/00718* (2013.01); *G06K 9/4628* (2013.01); *G06K 9/6217* (2013.01); *G06N 3/0445* (2013.01); *G06N 3/0454* (2013.01); *G06N 3/0472* (2013.01); *G06N 3/084* (2013.01); *G06N 3/088* (2013.01); *G06N 7/005* (2013.01); *G06K 2009/00738* (2013.01); *G06N 3/0481* (2013.01); *G06Q 50/01* (2013.01)

(58) Field of Classification Search
None
See application file for complete search history.

(56) References Cited

U.S. PATENT DOCUMENTS 10,268,913 B2* 4/2019 Lim ................... G06K 9/00973
2011/0317888 A1* 12/2011 Simon ................. G06K 9/6207
382/128

(Continued)

OTHER PUBLICATIONS

Lotter et al, Deep Predictive Coding Networks for Video Prediction and Unsupervised Learning, Published as a conference paper at ICLR Mar. 1, 2017 (Year: 2017).*

(Continued)

*Primary Examiner* — Andrae S Allison
(74) *Attorney, Agent, or Firm* — Baker Botts L.L.P.

(57) ABSTRACT

In one embodiment, a method includes receiving a plurality of input frames of a video sequence associated with a time t, predicting, using a convolutional network, one or more future frames of the video sequence from the plurality of input frames, wherein the convolutional network is trained with randomly selected temporal sequences of a n×m grid of pixels from the plurality of input frames exhibiting a threshold of optical flow. In addition, the training may comprise randomly selecting temporal sequences of a n×m grid of pixels from the plurality of input frames exhibiting a threshold of optical flow.

20 Claims, 26 Drawing Sheets

Related U.S. Application Data

(60) Provisional application No. 62/423,176, filed on Nov. 16, 2016.

(56) References Cited

U.S. PATENT DOCUMENTS

| | | | | |
|---|---|---|---|---|
| 2013/0114942 | A1* | 5/2013 | Yu | H04N 5/272 386/278 |
| 2014/0126769 | A1* | 5/2014 | Reitmayr | G06T 7/73 382/103 |
| 2014/0372175 | A1* | 12/2014 | Jain | H04W 76/12 705/7.31 |
| 2015/0287203 | A1* | 10/2015 | Baumberg | H04N 5/232 382/103 |
| 2018/0231653 | A1* | 8/2018 | Pradeep | G06K 9/00362 |
| 2018/0232571 | A1* | 8/2018 | Bathiche | G06K 9/00369 |
| 2018/0286055 | A1* | 10/2018 | Lim | G06T 7/215 |

OTHER PUBLICATIONS

Bailer, Christian, Kiran Varanasi, and Didier Stricker. "Cnn-based patch matching for optical flow with thresholded hinge loss." arXiv preprint arXiv:1607.08064 2.6 (2016): (Year: 2016).*

Kanska, titled: Using deep learning for Single Image Super Resolution, https://deepsense.ai/using-deep-learning-for-single-image-super-resolution/ (Year: 2017).*

* cited by examiner

Ranzato et al. result
PSNR = 16.3 (15.1), SSIM = 0.70 (0.55)

Prediction using a constant optical flow
PSNR = 24.7 (20.6), SSIM = 0.84 (0.72)

Ranzato et al. result
PSNR = 20.1 (17.8), SSIM = 0.72 (0.65)

DEEP MULTI-SCALE VIDEO PREDICTION

PRIORITY

This application is a continuation under 35 U.S.C. § 120 of U.S. patent application Ser. No. 15/814,782, filed 16 Nov. 2017, which claims the benefit, under 35 U.S.C. § 119(e), of U.S. Provisional Patent Application No. 62/423,176, filed 16 Nov. 2016, each of which is incorporated herein by reference.

TECHNICAL FIELD

This disclosure generally relates to predicting future images from a video sequence.

BACKGROUND

Predicting future images of a video sequence may require the use of training models that are able to accurately predict and construct image evolution accurately. These training models may require the input of one or more frames, and the prediction may be at a pixel-space level.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments, a computing device may receive a plurality of input frames of a video sequence associated with a time t. Then, the computing device may train a convolutional network to predict one or more future frames of the video sequence from the plurality of input frames based on a generative model. The training may comprise using an adversarial model and an image gradient difference loss model. The training may comprise randomly selecting temporal sequences of a n×m grid of pixels from the plurality of input frames exhibiting a threshold of optical flow. Thereafter, the computing device may output a first future frame of the video sequence associated with a time t+1 as predicted by the generative model. In particular embodiments, the computing device may predict a second future frame of the video sequence associated with time t+2 by using the first future frame as an input frame of the video sequence, recursively apply the generative model based on the first future frame, and outputting the second future frame of the video sequence associated with the time t+2 as predicted by the generative model.

The embodiments disclosed above herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
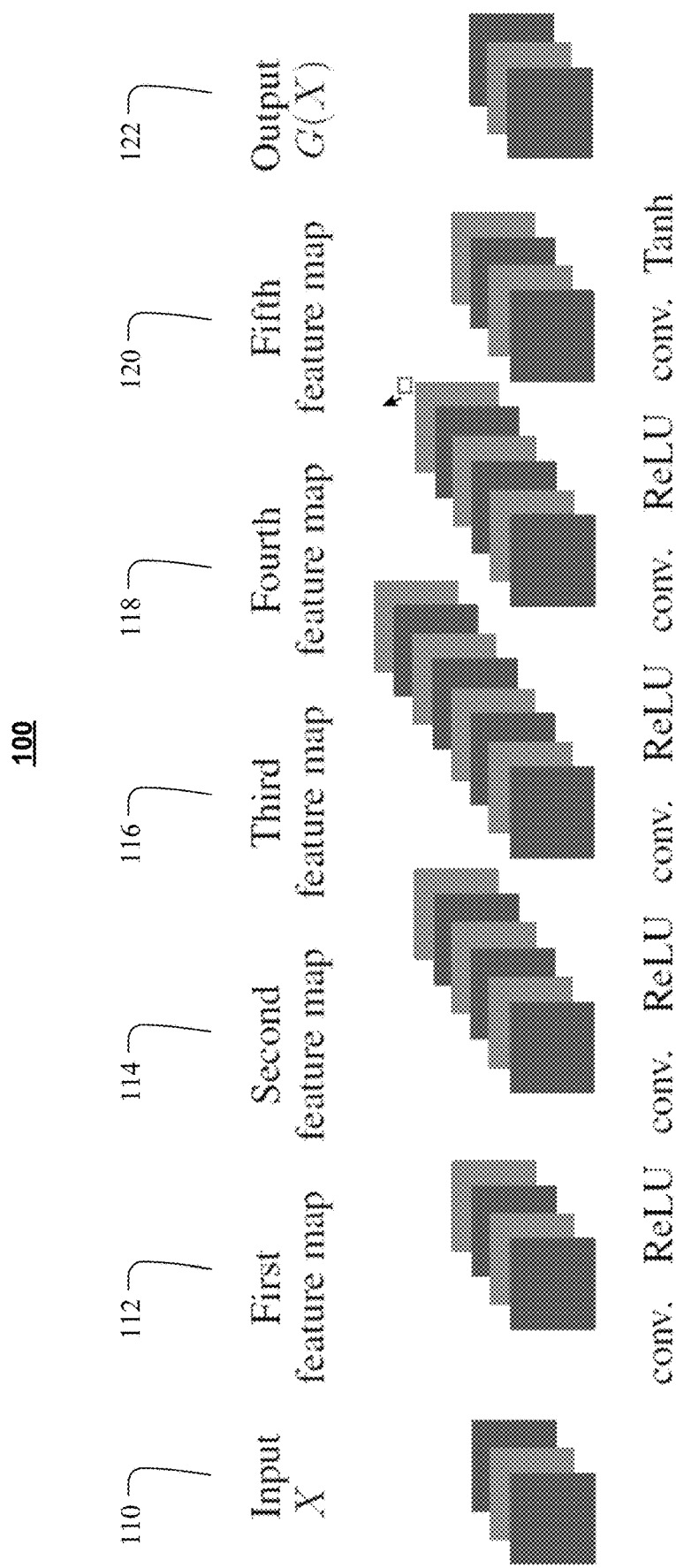
FIG. 1 illustrates a next frame prediction convolution sequence.

In particular embodiments, learning to predict future images from a video sequence may involve the construction of an internal representation that models the image evolution accurately, in addition to its content and dynamics. This is why pixel-space video prediction may be viewed as a promising avenue for unsupervised feature learning. In particular embodiments, many vision applications may benefit from the knowledge of upcoming frames of videos, for example, using a technique that does not require the complexity of tracking every pixel trajectory. Particular embodiments train a convolutional neural network (CNN) to generate future frames given an input sequence. As an example and not by way of limitation, to deal with blurry predictions obtained from a standard Mean Squared Error (MSE) loss function, particular embodiments may utilize three different and complementary feature learning strategies: a multi-scale architecture, an adversarial training method, and an image gradient difference loss function. Predictions generated by particular embodiments are compared herein to different published results based on recurrent neural network on the UCF101 dataset (e.g., an action recognition data set of realistic action videos, collected from YouTube, having 101 action categories).

Unsupervised feature learning of video representations is a promising direction of research because the resources are quasi-unlimited and the progress remaining to achieve in this area are important. Particular embodiments disclosed herein address the problem of frame prediction. As an example and not by way of limitation, a difference with the problem of image reconstruction is that the ability of a model to predict future frames may require building accurate, nontrivial internal representations, even in the absence of other constraints (such as sparsity). The better the prediction of such system are, the better the feature representations may be. In particular embodiments, learning representations by predicting the next sequence of image features has shown improved classification results on two action recognition datasets. Particular embodiments focus on predicting directly in pixel space and trying to address the inherent problems related to this approach.

In particular embodiments, unsupervised learning may be achieved by use of a convolutional model that may be trained to predict sets of future possible actions, or by use of a convolutional network that may be trained to learn to linearize motion in the code space. Besides unsupervised learning, a video predictive system may find applications in robotics, video compression, inpainting, other relevant applications, and any combination thereof.

Particular embodiments may address the problem of lack of sharpness in the frame predictions by utilizing a new loss function based on the image gradients, designed to preserve the sharpness of the frames. Particular embodiments includes different model architectures are described herein: simple, multi-scale, adversarial. In addition, particular embodiments may utilize the gradient difference loss function described herein.

Models

Particular video prediction models will be described herein. In particular embodiments, let $Y=\{Y^1, \ldots, Y^n\}$ be a sequence of frames to predict from input frames $X=\{X^1, \ldots, X^m\}$ in a video sequence. FIG. 1 illustrates a next frame prediction convolution sequence 100. As shown in FIG. 1, particular embodiments may utilize a CNN, alternating between convolutions and Rectified Linear Units (ReLU) from an input X 110, to a first feature map 112, to a second feature map 114, to a third feature map 116, to a fourth feature map 118, to a fifth feature map 120, to an output G(x). Such a network G, as displayed in FIG. 1, may be trained to predict one or several concatenated frames Y from the concatenated frames X by minimizing a distance, for instance $l_p$ with p=1 or p=2, between the predicted frame and the true frame:

$$\mathcal{L}_p(X,Y)=l_p(G(X),Y)=\|G(X)-Y\|_p^p \qquad \text{(Equation 1).}$$

In particular embodiments, convolutions may only account for short-range dependencies, limited by the size of their kernels. However, using pooling would only be part of the solution since the output has to be of the same resolution as the input. In particular embodiments, there may be a number of ways to avoid the loss of resolution brought about by pooling/subsampling while preserving long-range dependencies. As an example and the not by way of limitation, one method is to have no pooling/subsampling but many convolution layers. As another example and not by way of limitation, another method is to use connections that "skip" the pooling/unpooling pairs to preserve the high frequency information. As yet another example and not by way of limitation, another method is to combine multiple scales linearly as in the reconstruction process of a Laplacian pyramid. Particular embodiments may use one or more of these techniques.

In particular embodiments, using an $l_2$ loss, and to a lesser extent $l_1$, may produce blurry predictions, which may become increasingly worse when predicting further in the future. If the probability distribution for an output pixel has two equally likely modes $v_1$ and $v_2$, the value $v_{avg}=(v_1+v_2)/2$ may minimize the $l_2$ loss over the data, even if $v_{avg}$ has very low probability. In particular embodiments, in the case of an $l_1$ norm, this effect may diminish but does not disappear as the output value would be the median of the set of equally likely values. Although this disclosure describes using convolution models in a particular manner, this disclosure contemplates using convolution models in any suitable manner.

Multi-Scale Network

Figure 2:
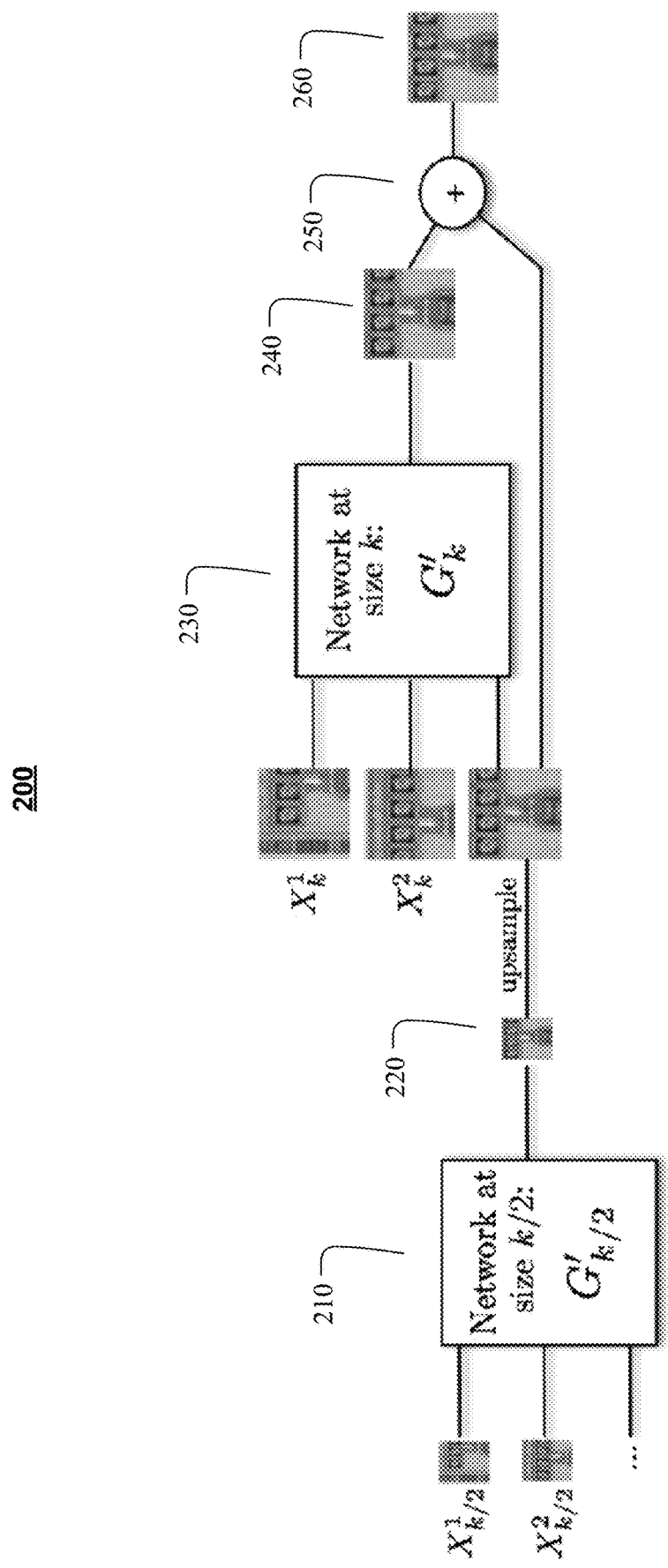
FIG. 2 illustrates a multi-scale architecture for making predictions

Particular embodiments may address the problem of convolutions only accounting for short-range dependencies (limited by the size of their kernels) by incorporating a multi-scale model. FIG. 2 illustrates a multi-scale architecture 200 for making predictions. In particular embodiments, a multi-scale version of the model may be defined as follows: Let $s_1, \ldots, s_N$ scales be the sizes of the inputs of the network. Particular embodiments may set $s_1=4\times 4$, $s_2=8\times 8$, $s_3=16\times 16$, and $s_4=32\times 32$. Let $u_k$ be the upscaling operator toward size $s_k$. Let $X_k^i$, $Y_k^i$ (denote the downscaled versions of $X^i$ and $Y^i$ of size $s_k$, and $G'_k$ be a network that learns to predict $Y_k-u_k(Y_{k-1})$ from $X_k$ and a coarse guess of $Y_k$. Particular embodiments may recursively define the network $G_k$, that makes a prediction $\hat{Y}_k$ of size $s_k$, by:

$$\hat{Y}_k=G_k(X)=u_k(\hat{Y}_{k-1})+G_k'(X_k,u_k(\hat{Y}_{k-1})) \qquad \text{(Equation 2).}$$

In particular embodiments, using Equation 2, the network may make a series of predictions, starting from the lowest resolution, and uses the prediction of size $s_k$ as a starting point to make the prediction of size $s_{k+1}$. At the lowest scale $s_1$, the network may take only $X_1$ as an input. This architecture is illustrated in FIG. 2. As show in FIG. 2, at step 210, $X_{k/2}^1, X_{k/2}^1, \ldots X_{k/2}^i$ are input into network $G_{k/2}'$ at size k/2, which outputs a frame 220, which is input at step 230, along with $X_k^1, X_k^2$, into network $G_k'$ at size k. This results in output frame 240, which at step 250 is then combined with frame 220 to results in final output frame 260. In particular embodiments, the set of trainable parameters is denoted $W_G$, and the minimization may be performed via Stochastic Gradient Descent (SGD).

In particular embodiments, despite the multi-scale architecture, the search of Y from X without making any assumption on the space of possible configurations may still lead to blurry predictions, because of reliance upon using an $ll_2$ loss, and to a lesser extent $ll_1$. In order to further reduce this effect, particular embodiments may incorporate an adversarial strategy and the image gradient difference loss.

Adversarial Training

Particular embodiments based on generative adversarial networks may generate image patches from random noise using two networks trained simultaneously. Such networks may use a discriminative network D to estimate the probability that a sample comes from the dataset instead of being produced by a generative model G. The two models are simultaneously trained so that G learns to generate frames that are hard to classify by D, while D learns to discriminate the frames generated by G. In particular embodiments, when G is trained, it should not be possible for D to perform better than chance.

Particular embodiments may adapt this approach for the purpose of frame prediction. The generative model G is typically the one described above. In particular embodiments, the discriminative model D takes a sequence of frames and is trained to predict the probability that the last frames of the sequence are generated by G. In particular embodiments, only the last frames may be either real or generated by G; the rest of the sequence may be from the dataset. This allows the discriminative model to make use of temporal information, so that G may learn to produce sequences that are temporally coherent with its input. In particular embodiments, since G may be conditioned on the input frames X, there is variability in the input of the generator even in the absence of noise, so noise is not a necessity. Particular embodiments may train the network with and without adding noise.

Particular embodiments use an adversarial loss function. An adversarial loss function may address issues caused by reliance upon using an $l_2$ loss, and to a lesser extent $l_1$. In particular embodiments, for a sequence of frames $X = (X^1, \ldots, X^m)$ in the dataset, the next frames may be either $Y = (Y^1, \ldots, Y^n)$ or $Y' = (Y'^1, \ldots, Y'^n)$, with equal probability. In particular embodiments, training the network with an $ll_2$ loss may result in predicting the average frames $Y_{avg} = (Y + Y')/2$. However, the sequence $(X, Y_{avg})$, composed of the frames of X followed by the frames of $Y_{avg}$, is not a likely sequence, and D may discriminate them easily. In particular embodiments, the only sequences the model D may not be able to classify as fake are (X, Y) and (X, Y').

In particular embodiments, the discriminative model D may be a multi-scale convolutional network with a single scalar output. The training of the pair (G, D) consists of two alternated steps, described below. Particular embodiments may use pure SGD (minibatches of size 1); alternative embodiments may generalize the algorithm to minibatches of size M by summing the losses over the samples.

When training discriminative model D, particular embodiments may utilize a sample (X, Y) from the dataset. In particular embodiments, X, and respectively Y, is a sequence of m, and respectively n, frames. Particular embodiments train discriminative model D to classify the input (X, Y) into class 1 and the input (X, G(X)) into class 0. As an example and not by way of limitation, for each scale k, particular embodiments may perform one SGD iteration of $D_k$ while keeping the weights of G fixed. In particular embodiments, discriminative model D may be trained within the target=1 for the datapoint $(X_k, Y_k)$, and the target=0 for $(X_k, G_k(X_k))$. As an example and not by way of limitation the loss function used to train D may be:

$$\mathcal{L}_{adv}^D(X, Y) = \sum_{k=1}^{N_{scales}} L_{bce}(D_k(X_k, Y_k), 1) + L_{bce}(D_k(X_k, G_k(X)), 0) \quad \text{(Equation 3)}$$

where $L_{bce}$ is the binary cross-entropy loss, defined as $$L_{bce}(Y, \hat{Y}) = -\sum_i \hat{Y}_i \log(Y_i) + (1 - \hat{Y}_i)\log(1 - Y_i) \quad \text{(Equation 4)}$$

where $Y_i$ takes its values in $\{0, 1\}$ and $\hat{Y}_i$ in $[0, 1]$.

When training generative model G, particular embodiments may utilize a different sample (X, Y) from the dataset. While keeping the weights of D fixed, particular embodiments perform one SGD step on G to minimize the adversarial loss:

$$\mathcal{L}_{adv}^G(X, Y) = \sum_{k=1}^{N_{scales}} L_{bce}(D_k(X_k, G_k(X_k)), 1). \quad \text{(Equation 5)}$$

In particular embodiments, minimizing this loss may mean that the generative model G is making the discriminative model D as "confused" as possible, in the sense that D will not discriminate the prediction correctly. However, in practice, minimizing this loss alone may lead to instability. G may generate samples that "confuse" D, without being close to Y. In turn, D may learn to discriminate these samples, leading G to generate other "confusing" samples, and so on. To address this, particular embodiments may train the generator with a combined loss composed of the adversarial loss and the $L_p$ loss. The generator G may therefore be trained to minimize $\lambda_{adv} L_{adv}^G + \lambda_{lp} L_p \lambda_{adv} L_{adv} + \lambda_{lp} L_p$. In particular embodiments, there is a tradeoff to adjust, by the means of the $\lambda_{adv} \lambda_{adv}$ and $\lambda_{lp} \lambda_{lp}$ parameters, between sharp predictions due to the adversarial principle, and similarity with the ground truth brought by the second term. This process is summarized in Algorithm 1, with minibatches of size M, described below.

---

Algorithm 1: Training adversarial networks for next frame generation

Set the learning rates $\rho_D$ and $\rho_G$, and weights $\lambda_{adv}$, $\lambda_{l_p}$.
while not converged do
    Update the discriminator D:
    Get M data samples $(X, Y) = (X^{(1)}, Y^{(1)}), \ldots, (X^{(M)}, Y^{(M)})$ $$W_D = W_D - \rho_D \sum_{i=1}^{M} \frac{\partial \mathcal{L}_{adv}^D(X^{(i)}, Y^{(i)})}{\partial W_D}$$

Update the generator G:
    Get M new data samples $(X, Y) = (X^{(1)}, Y^{(1)}), \ldots, (X^{(M)}, Y^{(M)})$ -continued Algorithm 1: Training adversarial networks for next frame generation $$W_G = W_G - \rho_G \sum_{i=1}^{M} \left( \lambda_{adv} \frac{\partial \mathcal{L}_{adv}^G(X^{(i)}, Y^{(i)})}{\partial W_G} + \lambda_{l_p} \frac{\partial \lambda_{l_p}(X^{(i)}, Y^{(i)})}{\partial W_G} \right)$$

Image Gradient Difference Loss (GDL)

Another strategy to sharpen the image prediction is to directly penalize the differences of image gradient predictions in the generative loss function. Particular embodiments define a new loss function, the Gradient Difference Loss (GDL), that can be combined with a $l_p$ and/or adversarial loss function. The GDL function between the ground truth image Y, and the prediction G(X)=Ŷ may be given by $$\mathcal{L}_{gdl}(X, Y) =$$ (Equation 6)

$$L_{gdl}(\hat{Y}, Y) = \sum_{i,j} \left\| |Y_{i,j} - Y_{i-1,j}| - |\hat{Y}_{i,j} - \hat{Y}_{i-1,j}| \right\|^\alpha + \left\| |Y_{i,j-1} - Y_{i,j}| - |\hat{Y}_{i,j-1} - \hat{Y}_{i,j}| \right\|^\alpha,$$

where α is an integer greater or equal to 1, and | | denotes the absolute value function. While a total variation regularization approach takes only the reconstructed frame in input, in particular embodiments, an approach may be taken in which the loss penalizes gradient differences between the prediction and the true output. Particular embodiments select the simplest possible image gradient by considering the neighbor pixel intensities differences, rather than adopting a more sophisticated norm on a larger neighborhood, in order to keep the training time low.

Combining Losses

Particular embodiments combine the losses previously defined with different weights. The final loss equation is:

$$\mathcal{L}(X,Y) = \lambda_{adv}\mathcal{L}_{adv}^G(X,Y) + \lambda_{l_p}\mathcal{L}_p(X,Y) + \lambda_{gdl}\mathcal{L}_{gdl}(X,Y)$$ (Equation 7).

Experimental Results (Using 4 Input Frames to Predict 1 Frame)

Figure 3A:
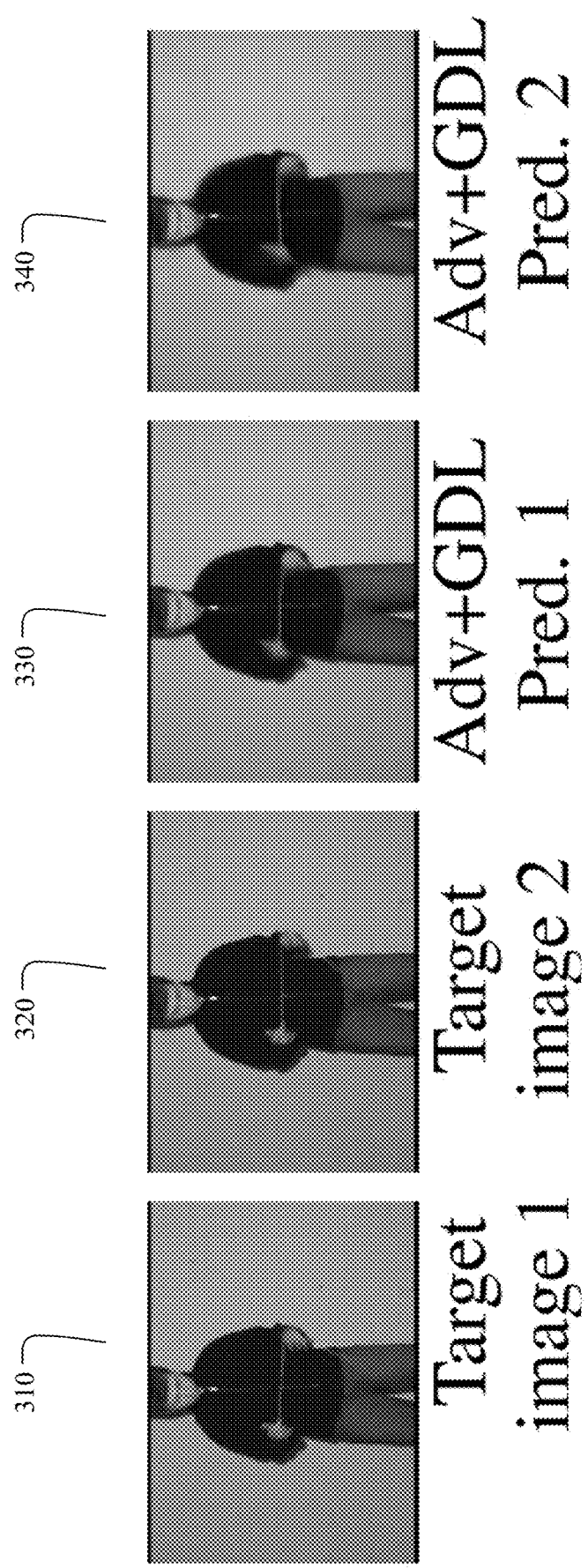
FIGS. 3A and 3B illustrate the use of particular areas of video for use in future frame prediction.
Figure 3B:
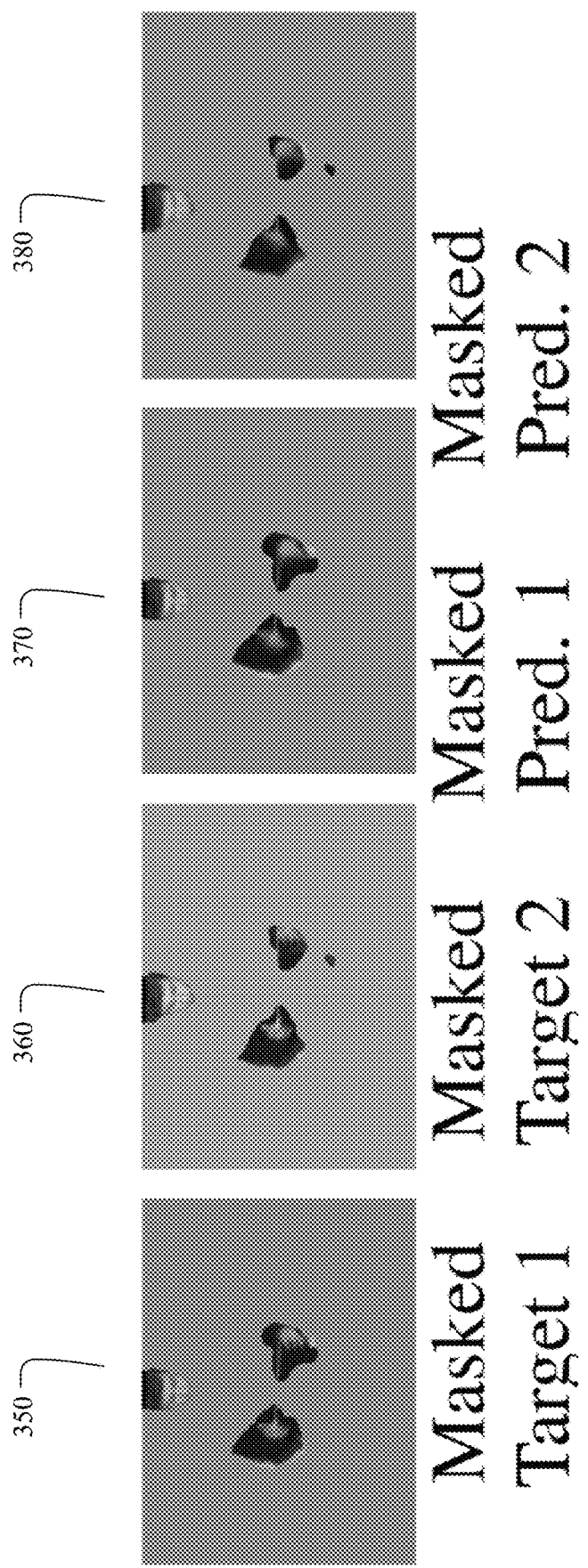

Discussed below is a quantitative evaluation of the quality of video predictions performed by embodiments described herein. FIGS. 3A and 3B illustrate the use of particular areas of video for use in future frame prediction. FIGS. 4A-4F illustrate video clips from Sport1m for training video predictions. FIGS. 5A-5H illustrate video clips from UCF101 for training video predictions. In particular embodiments, two configurations were trained and compared: (1) Use of 4 input frames to predict one future frame. In order to generate frames further in the future, the model may be applied recursively by using the newly generated frame as an input. (2) Use of 8 input frames to produce 8 frames simultaneously, which represents a more difficult problem.

In particular embodiments, the Sports1m video clips shown in FIGS. 4A-4F were utilized for training because many of the frames in the UCF101 video clips only have a very small portion of the image that is actually moving, while the rest of the image is just a fixed background. In particular embodiments, a network may be trained by randomly selecting temporal sequences of patches of 32×32 pixels after making sure they show enough movement (quantified by the $l_2$ difference between the frames). The data patches are first normalized so that their values range between −1 and 1.

In particular embodiments, multi-scale architectures may employed in generating the results discussed herein. The baseline models may use $l_1$ and $l_2$ losses. The GDL-$l_1$ (respectively GDL-ll$_2$) model may use a combination of the GDL with α=1 (respectively α=2) and p=1 (respectively p=2) loss; the relative weights $\lambda_{gdl}\lambda_{gdl}$ and $\lambda_{lp}\lambda_{lp}$ are both 1. The adversarial (Adv) model uses the adversarial loss, with p=2 weighted by $\lambda_{adv}\lambda_{adv}$=0.05 and $\lambda_{lp}\lambda_{lp}$=1. Finally, the Adv+GDL model is a combination of the adversarial loss and the GDL, with the same parameters as for Adv with αα=1 and $\lambda_{gdl}\lambda_{gdl}$=1.

Generative model G architecture is presented in Table 1 below.

TABLE 1

| Network architecture (Input: 4 frames-output: 1 frame) | | | | |
|---|---|---|---|---|
| Generative network scales | G$_1$ | G$_2$ | G$_3$ | G$_4$ |
| Number of feature maps | 128, 256, 128 | 128, 256, 128 | 128, 256, 512, 256, 128 | 128, 256, 512, 256, 128 |
| Conv. kernel size | 3, 3, 3, 3 | 5, 3, 3, 5 | 5, 3, 3, 3, 5 | 7, 5, 5, 5, 5, 7 |
| Adversarial network scales | D$_1$ | D$_2$ | D$_3$ | D$_4$ |
| Number of feature maps | 64 | 64, 128, 128 | 128, 256, 256 | 128, 256, 512, 128 |
| Conv. kernel size (no padding) | 3 | 3, 3, 3 | 5, 5, 5 | 7, 7, 5, 5 |
| Fully connected | 512, 256 | 1024, 512 | 1024, 512 | 1024, 512 |

Particular embodiments contain padded convolutions interlaced with ReLU non-linearities. A hyperbolic tangent (Tan h) may be added at the end of the model to ensure that the output values are between −1 and 1. The learning rate $\rho_G\rho_G$ may start at 0.04 and is reduced over time to 0.005. The minibatch size may be set to 4, or 8 in the case of the adversarial training, to take advantage of GPU hardware capabilities. Particular embodiments may train the network on small patches, and since it is fully convolutional, it may be applied on larger images at test time.

In particular embodiments, for adversarial training, the discriminative model D, also presented in Table 1, may use standard non-padded convolutions followed by fully connected layers and ReLU non-linearities. For the largest scale $s_4$, a 2×2 pooling may be added after the convolutions. The network may be trained by setting the learning rate $\rho_D\rho_D$ to 0.02.

To evaluate the quality of the image predictions resulting from the different tested systems, particular embodiments compute the Peak Signal to Noise Ratio (PSNR) between the true frame Y (e.g., a ground truth frame) and the prediction frame Ŷ:

$$PSNR(Y, \hat{Y}) = 10\log_{10}\frac{\max_{\hat{Y}}^2}{\frac{1}{N}\sum_{i=0}^{N}(Y_i - \hat{Y}_i)^2}$$

(Equation 8) where $\max_{\hat{Y}}$ is the maximum possible value of the image intensities. In particular embodiments, a Structural Similarity Index Measure (SSIM) may range between −1 and 1, a larger score meaning a greater similarity between the two images.

To measure the loss of sharpness between the true frame and the prediction, particular embodiments define the following sharpness measure based on the difference of gradients between two images Y and $\hat{Y}$:

$$\text{Sharp. diff.}(Y, \hat{Y}) =$$

$$10\log_{10}\frac{\max_{\hat{Y}}^2}{\frac{1}{N}\left(\sum_i\sum_j\left|(\nabla_i Y + \nabla_j Y) - (\nabla_i \hat{Y} + \nabla_j \hat{Y})\right|\right)}, \text{ where}$$

(Equation 9)

$$\nabla_i Y = |Y_{i,j} - Y_{i-1,j}| \text{ and}$$
$$\nabla_j Y = |Y_{i,j} - Y_{i,j-1}|.$$

(Equation 10)

In particular embodiments, a larger score is better. As an example, these quantitative measures on 378 test videos from UCF101 (as shown in FIGS. 5A-5H) are given in Table 2:

in an entire image with ground truth. FIG. 3B illustrates images masked with thresholded optical flow so as to isolate the moving areas.

Particular embodiments compute the different quality measures only in the areas where the optical flow is higher than a fixed threshold. Using the EpicFlow method (Edge-Preserving Interpolation of Correspondences for Optical Flow), if at least one color channel is lower than 0.2 (image color range between 0 and 1), particular embodiments reset the corresponding pixel intensity of the output and ground truth to 0, and compute similarity measures in the resulting masked images. Similarity and sharpness measures computed on the whole images are discussed with respect to Tables 3-5 and FIGS. 6A-6D, discussed below.

The numbers in Table 2 may indicate that all strategies perform better than the $ll_2$ predictions in terms of PSNR, SSIM, and sharpness. In particular embodiments, the multi-scale model may bring some improvement, but used with an $l_2$ norm, it may not outperform simple frame copy in the moving areas. In particular embodiments, the $l_1$ model may improve the results, since it replaces the mean by the median value of individual pixel predictions. In particular embodiments, the GDL and adversarial predictions may lead to further gains, and finally the combination of the multi-scale, $l_1$ norm, GDL, and adversarial training achieves the best PSNR, SSIM, and Sharpness difference measures.

While particular embodiments shows that the $l_2$ norm may be a poor metric for training predictive models, particular embodiments also show that the PSNR at test time may be the worst for models trained optimizing the $l_2$ norm, although the PSNR is based on the $l_2$ metric. Particular

TABLE 2

Comparison of the accuracy of the predictions on 10% of the UCF101 test images. The different models have been trained given 4 frames to predict the next one. Similarity and sharpness measures evaluated only in the areas of movement. Our best model has been fine-tuned on UCF101 after the training on Sports1m.

|  | 1st frame prediction scores | | | 2nd frame prediction scores | | |
| --- | --- | --- | --- | --- | --- | --- |
|  | Similarity | | | Similarity | | |
|  | PSNR | SSIM | Sharpness | PSNR | SSIM | Sharpness |
| single sc. $l_2$ | 26.5 | 0.84 | 24.7 | 22.4 | 0.82 | 24.2 |
| $l_2$ | 27.6 | 0.86 | 24.7 | 22.5 | 0.81 | 24.2 |
| $l_1$ | 28.7 | 0.88 | 24.8 | 23.8 | 0.83 | 24.3 |
| GDL $l_1$ | 29.4 | 0.90 | 25.0 | 24.9 | 0.84 | 24.4 |
| GDL $l_1$* | 29.9 | 0.90 | 25.0 | 26.4 | 0.87 | 24.5 |
| Adv* | 30.6 | 0.89 | 25.2 | 26.1 | 0.85 | 24.2 |
| Adv + GDL* | 31.5 | 0.91 | 25.4 | 28.0 | 0.87 | 25.1 |
| Adv + GDL fine-tuned * | 32.0 | 0.92 | 25.4 | 28.9 | 0.89 | 25.0 |
| Last input | 28.6 | 0.89 | 24.6 | 26.3 | 0.87 | 24.2 |
| Optical flow | 31.6 | 0.93 | 25.3 | 28.2 | 0.90 | 24.7 |

*models fine-tuned on patches of size 64 × 64.

In particular embodiments, the different models have been trained by using four frames to predict the next one. Similarity and sharpness measures may be evaluated only in the areas of movement. In particular embodiments, one model has been fine-tuned on UCF101 after the training on Sports1m.

In particular embodiments, since it is trivial to predict pixel values in static areas, especially on the UCF101 dataset where most of the images are still, particular embodiments focused evaluation in the moving areas. As shown in FIGS. 3A and 3B, evaluation of the accuracy of future frames prediction may only take the moving areas of the images into account. FIG. 3A illustrates an example of frame predictions embodiments also extrapolate the pixels of the next frame by propagating the optical flow from the previous ones.

Figure 4A:
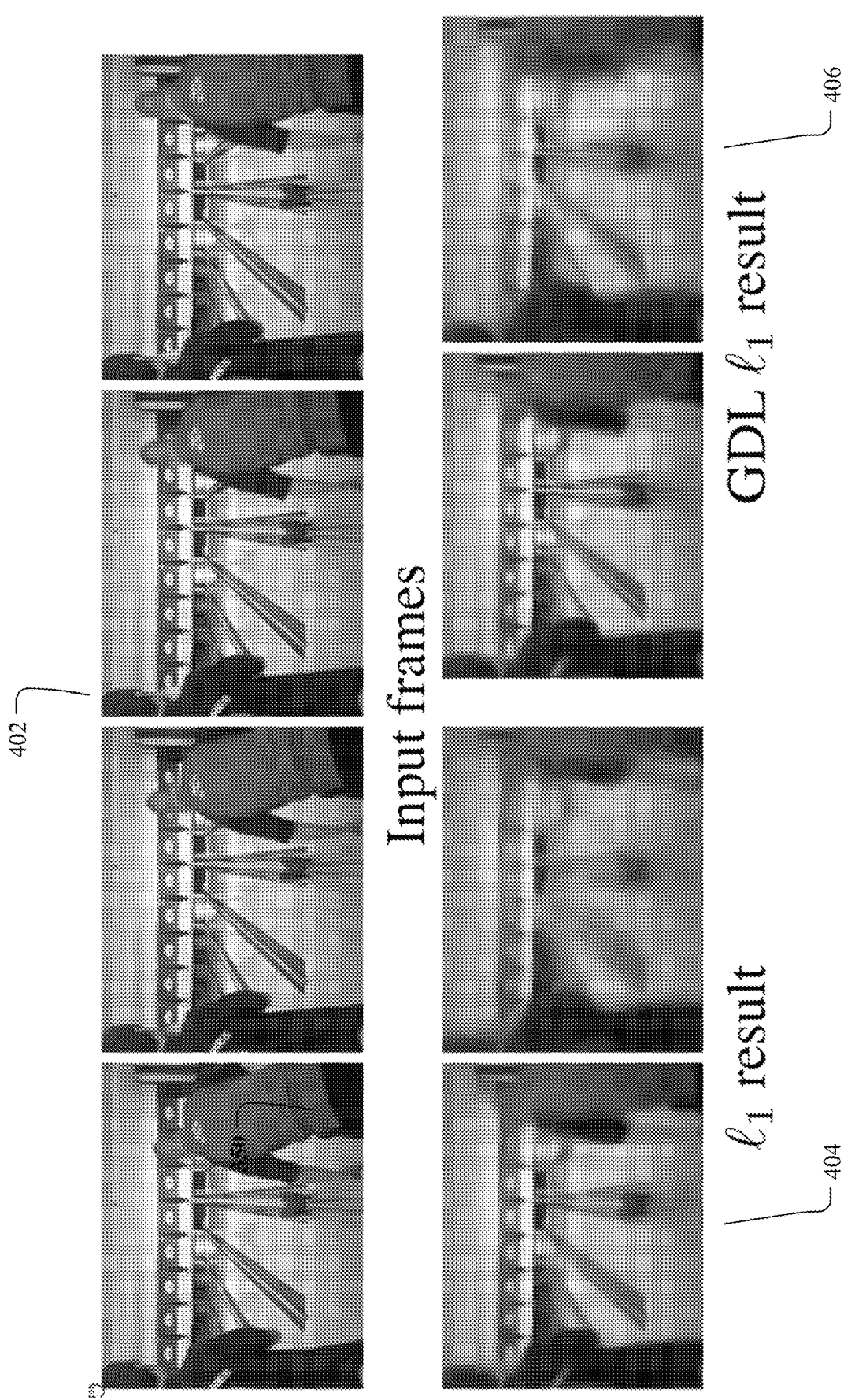
FIGS. 4A-4F illustrate video clips from Sport1m for training video predictions.
Figure 4B:
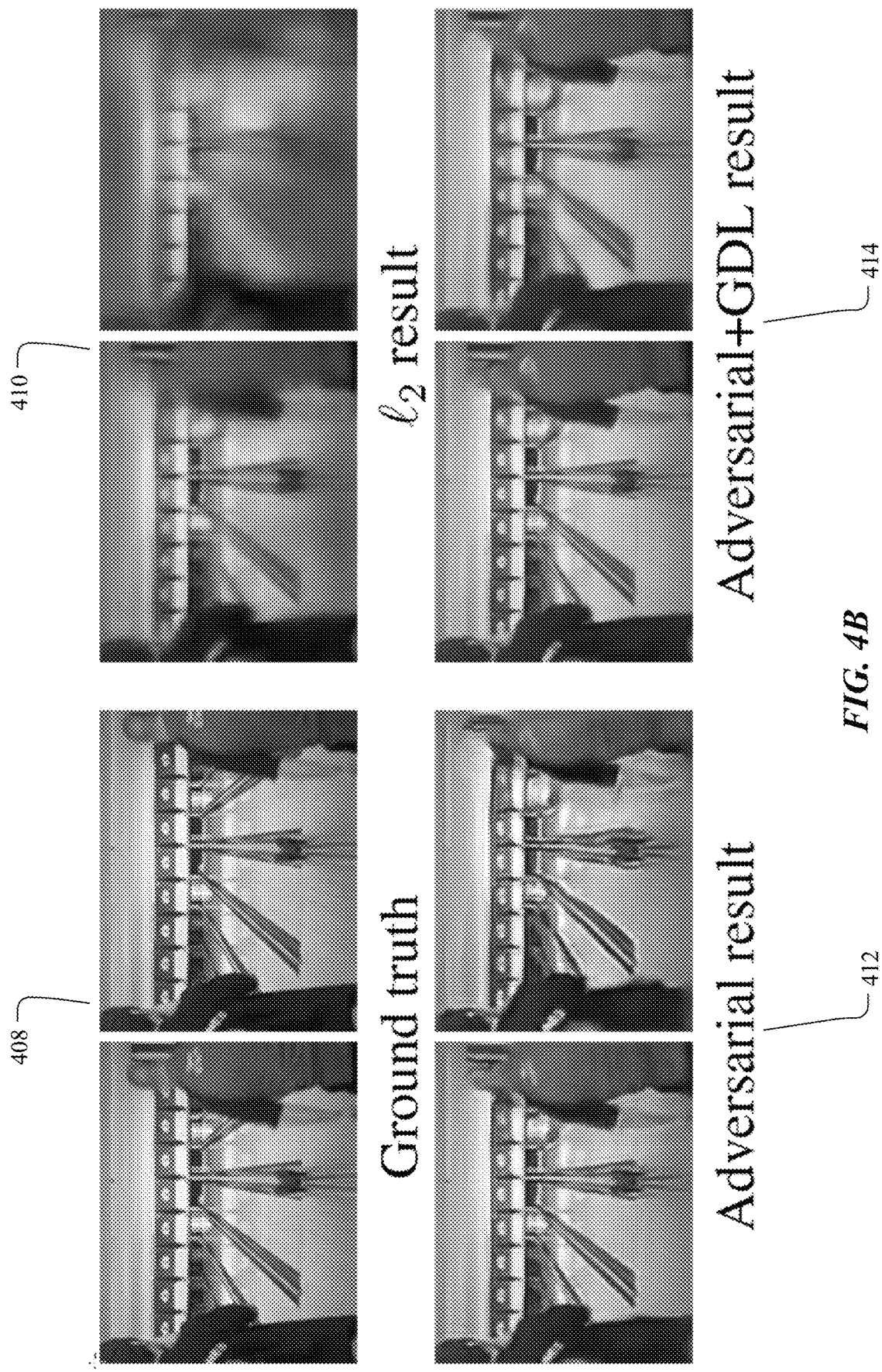
Figure 4C:
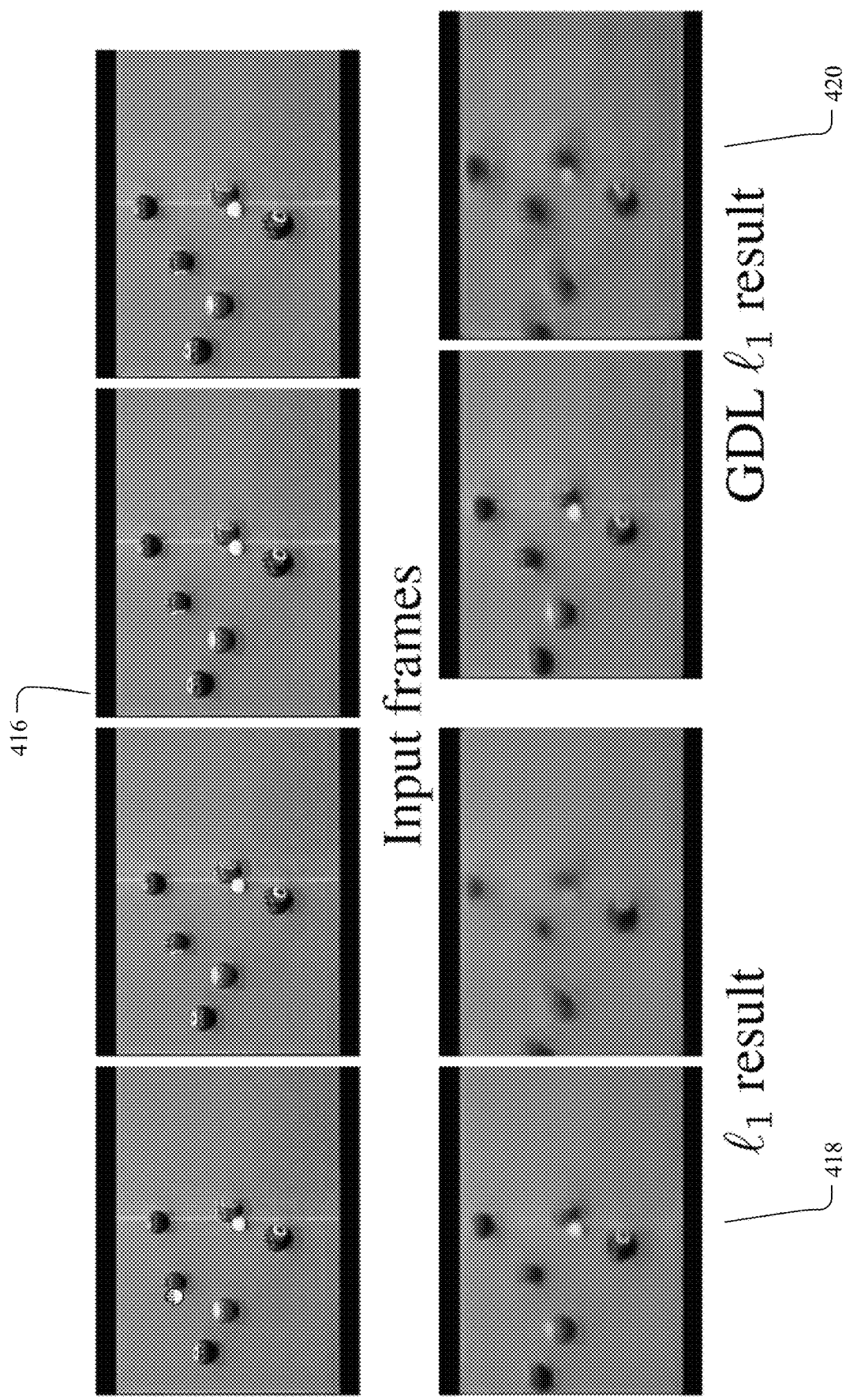
Figure 4D:
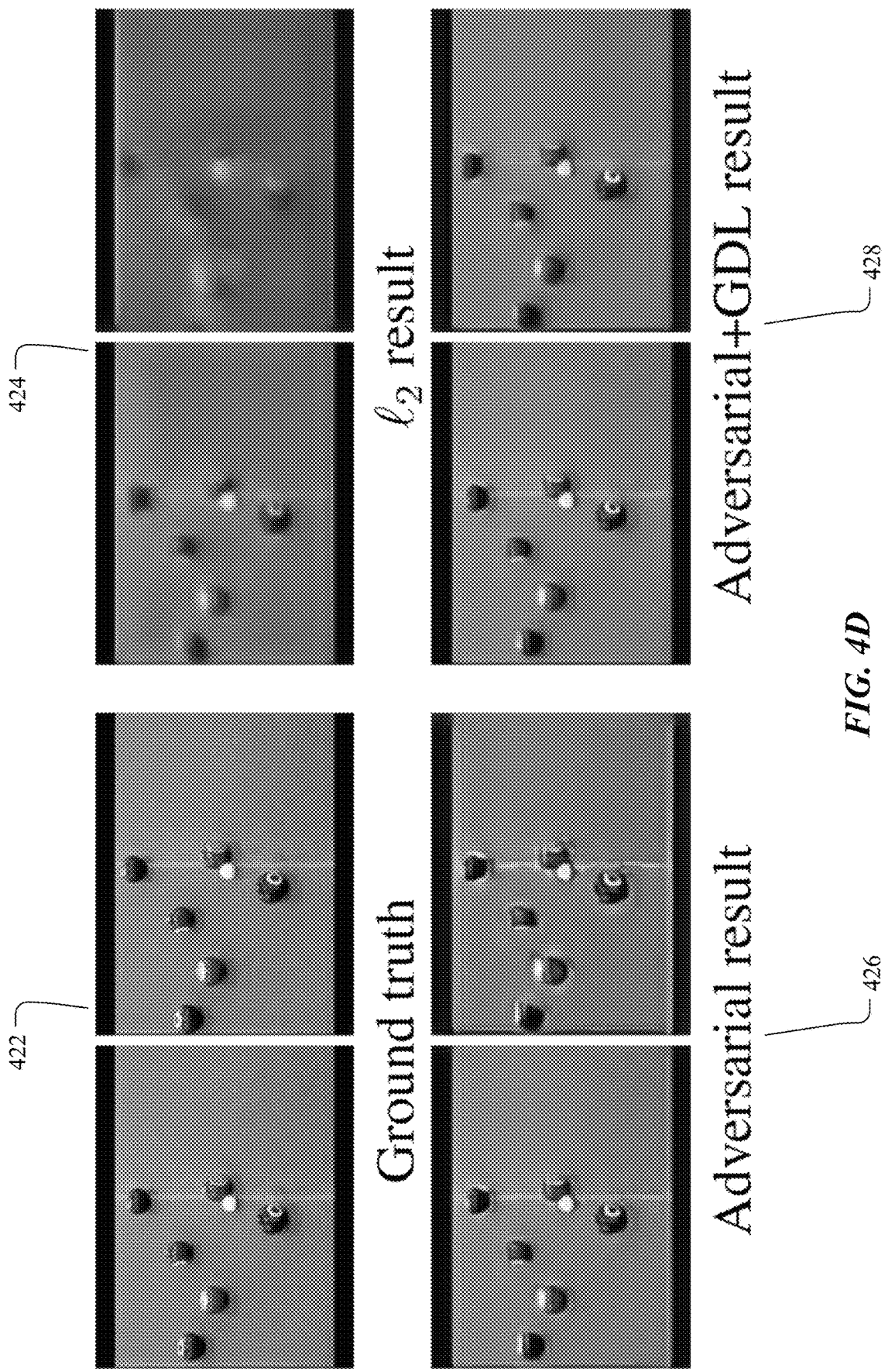

FIGS. 4A-4F illustrate results on three video clips from the Sport1m dataset, as movements are more visible in this dataset. As described above, four input frames may be used to predict one future frame. In particular embodiments, a second output frame may be computed recursively. Specifically, FIGS. 4A and 4B show four input frames 402 that are taken from video of two people bowling, an $l_1$ norm result 404, a GDL result 406, a ground truth result 408 (e.g., the observed and actual next two frames), an $l_2$ norm result 410, an adversarial result 412, and a combined adversarial and GDL result 414. FIGS. 4C and 4D show four input frames

Figure 4E:
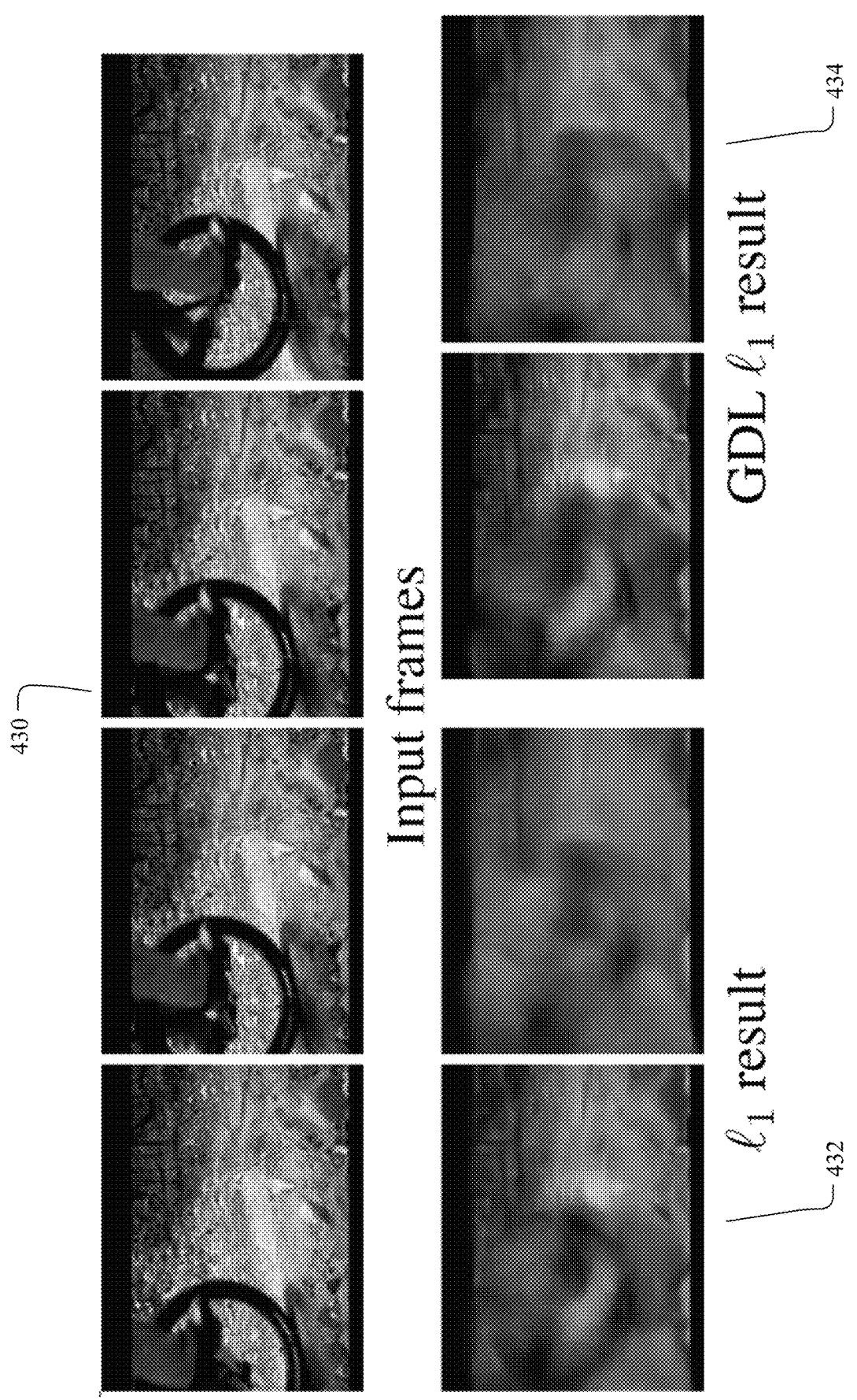
Figure 4F:
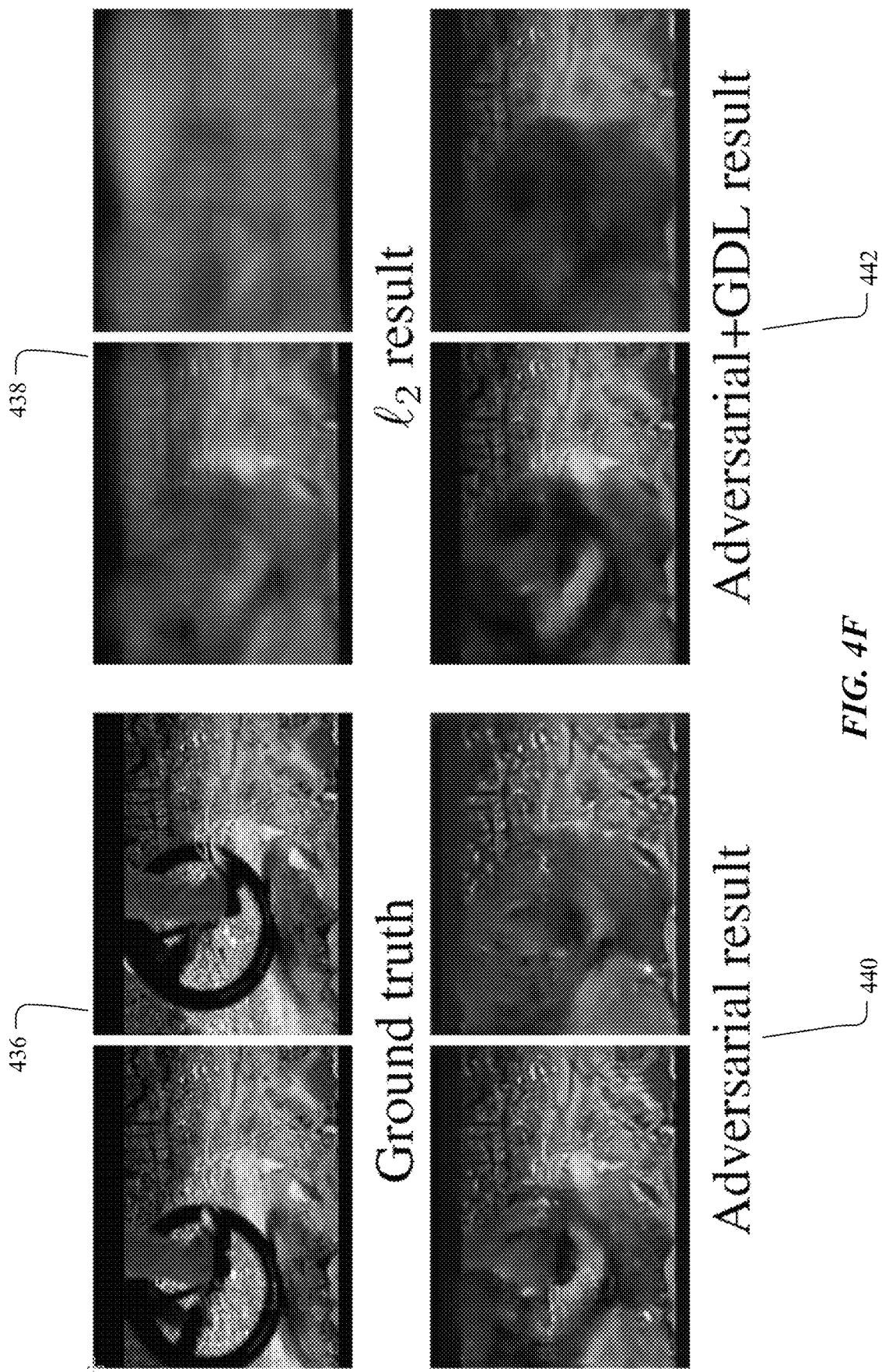
Figure 5A:
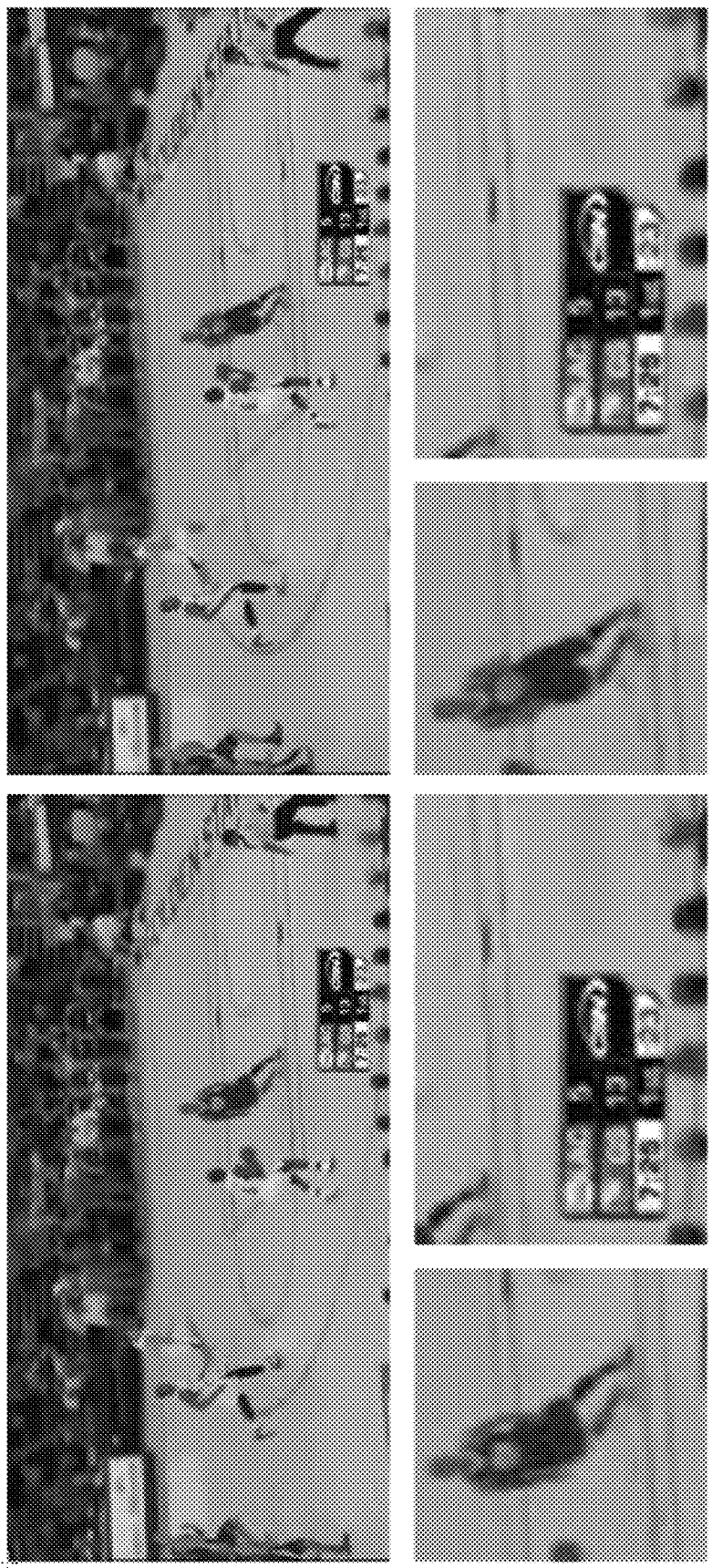
FIGS. 5A-5H illustrate video clips from UCF101 for training video predictions.
Figure 5B:
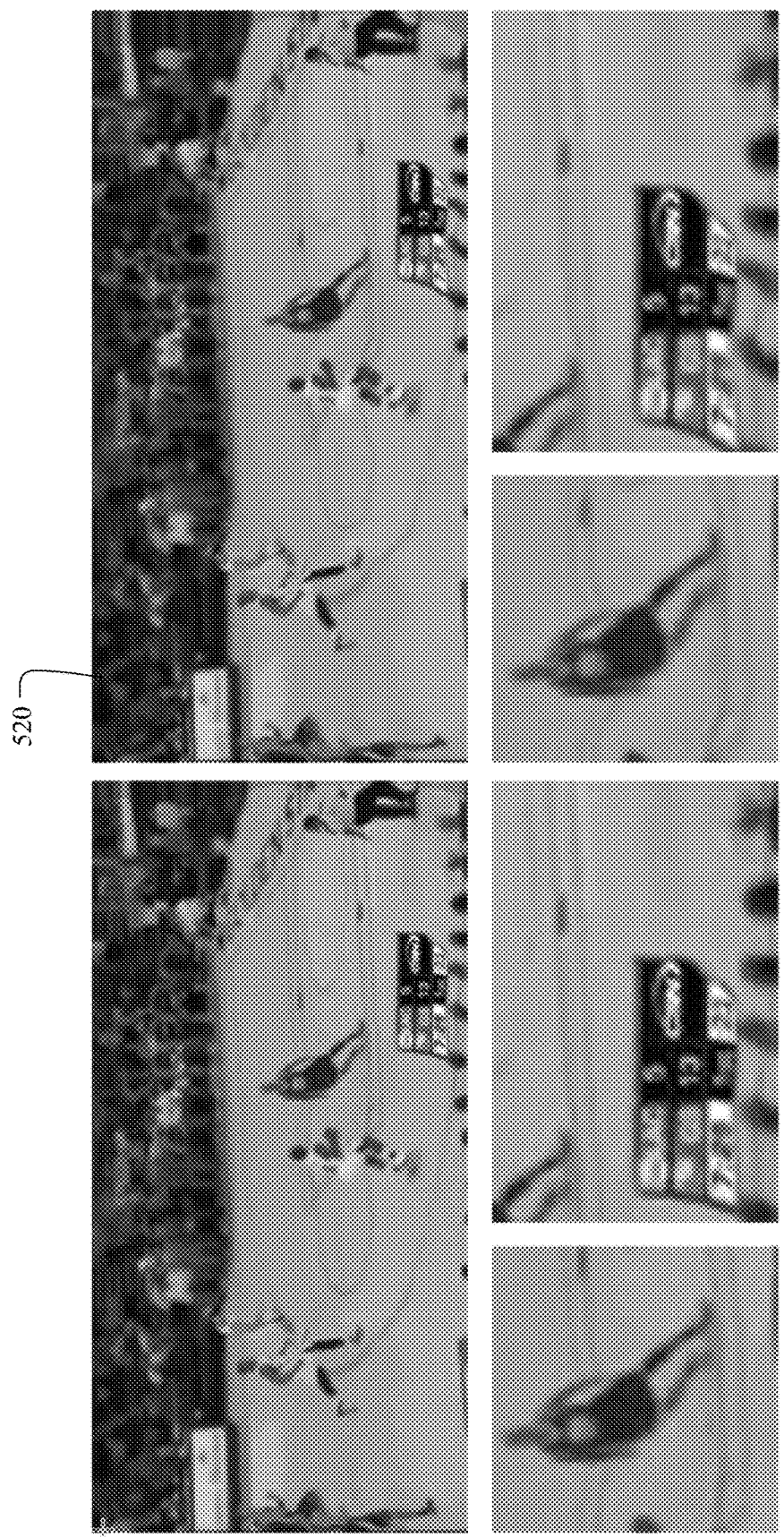
Figure 5C:
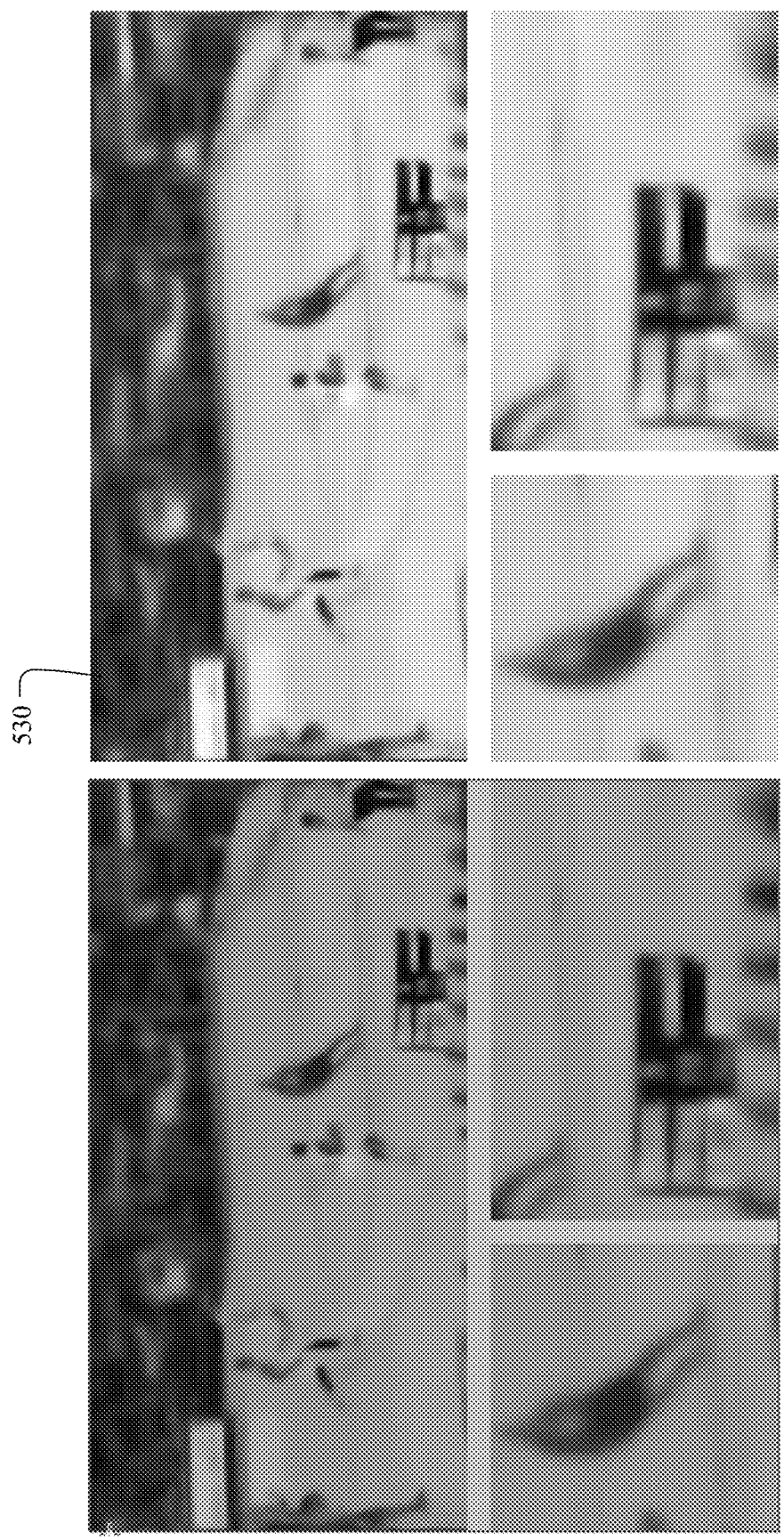
Figure 5D:
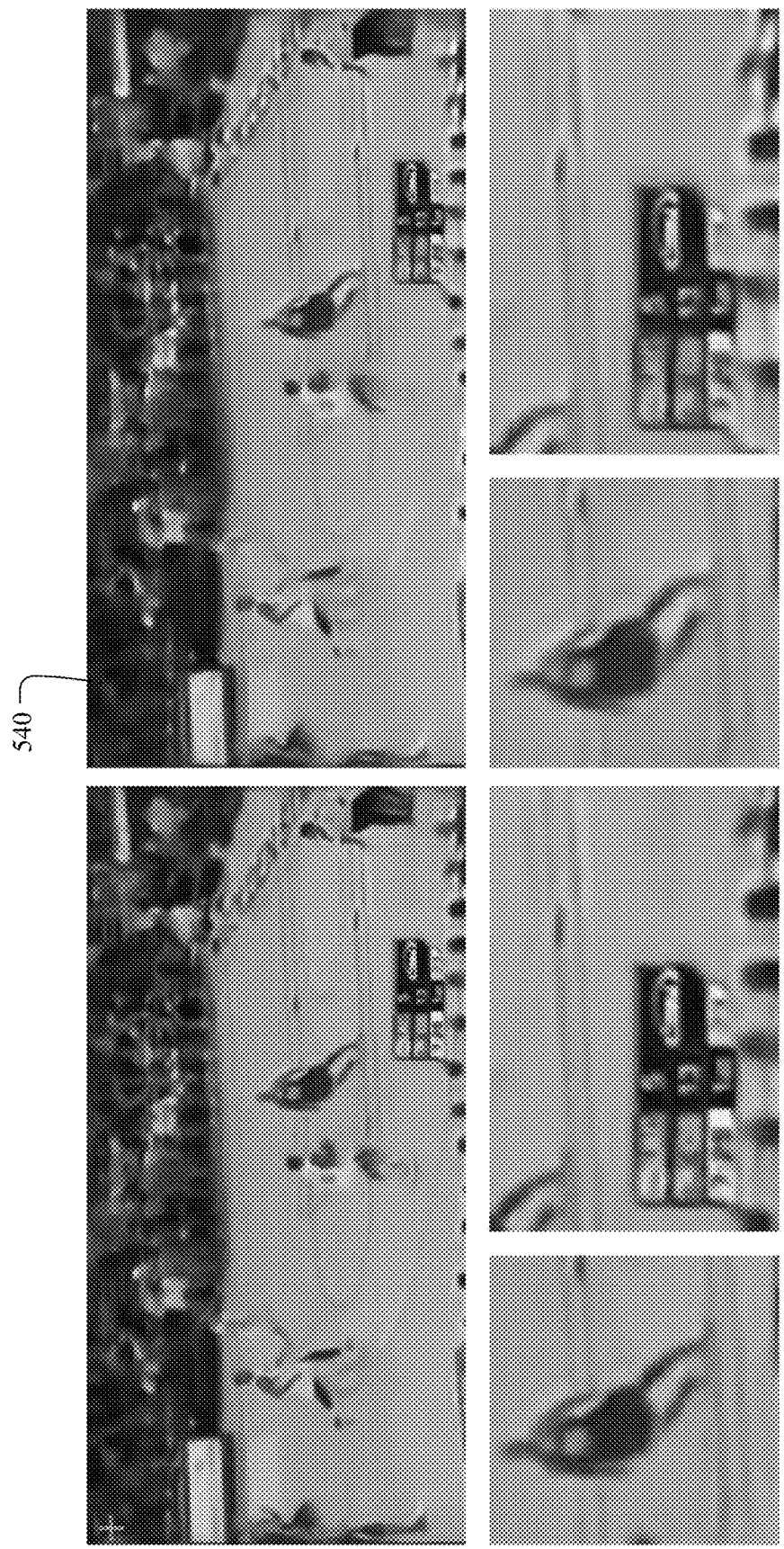
Figure 5E:
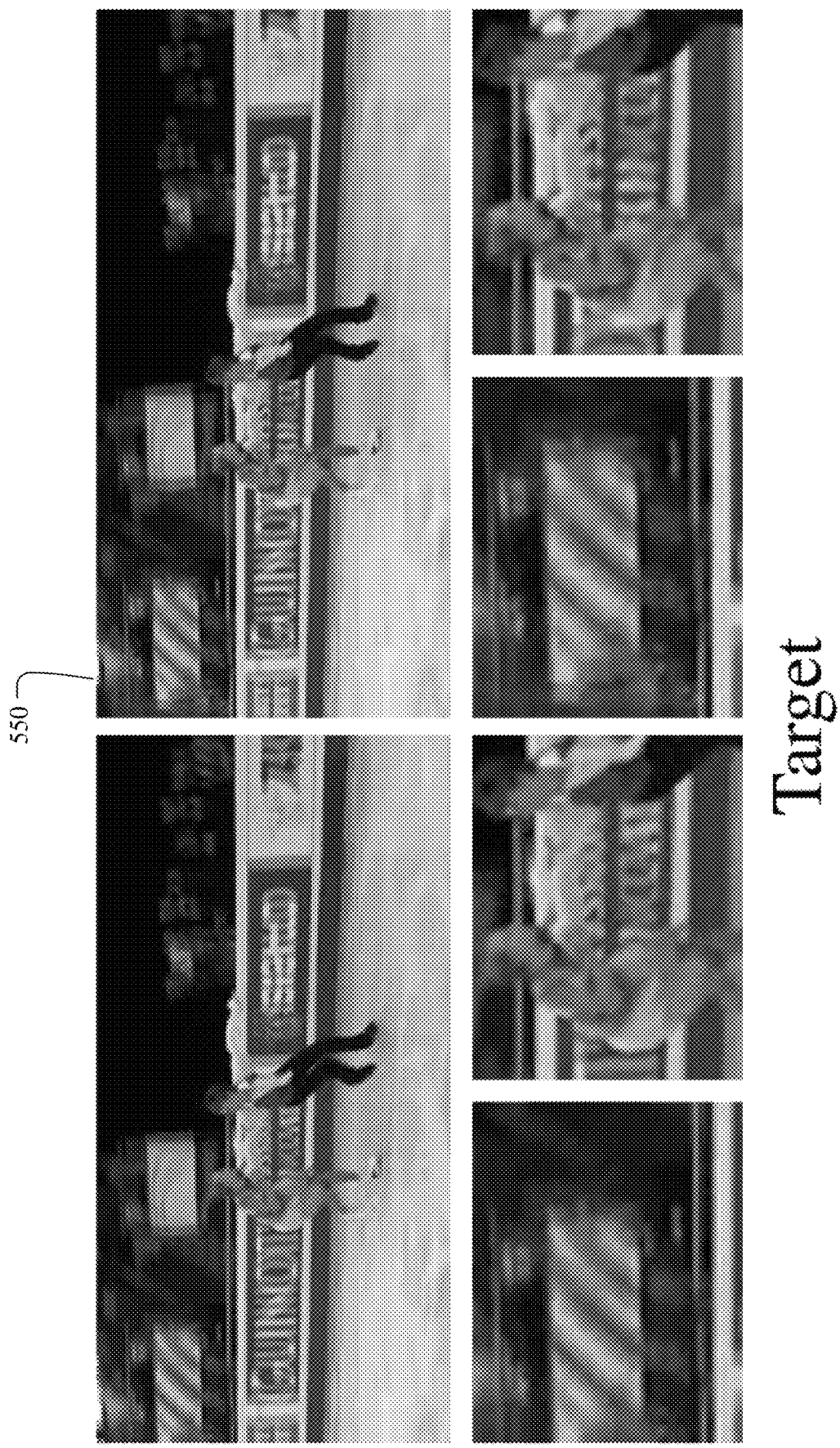
Figure 5F:
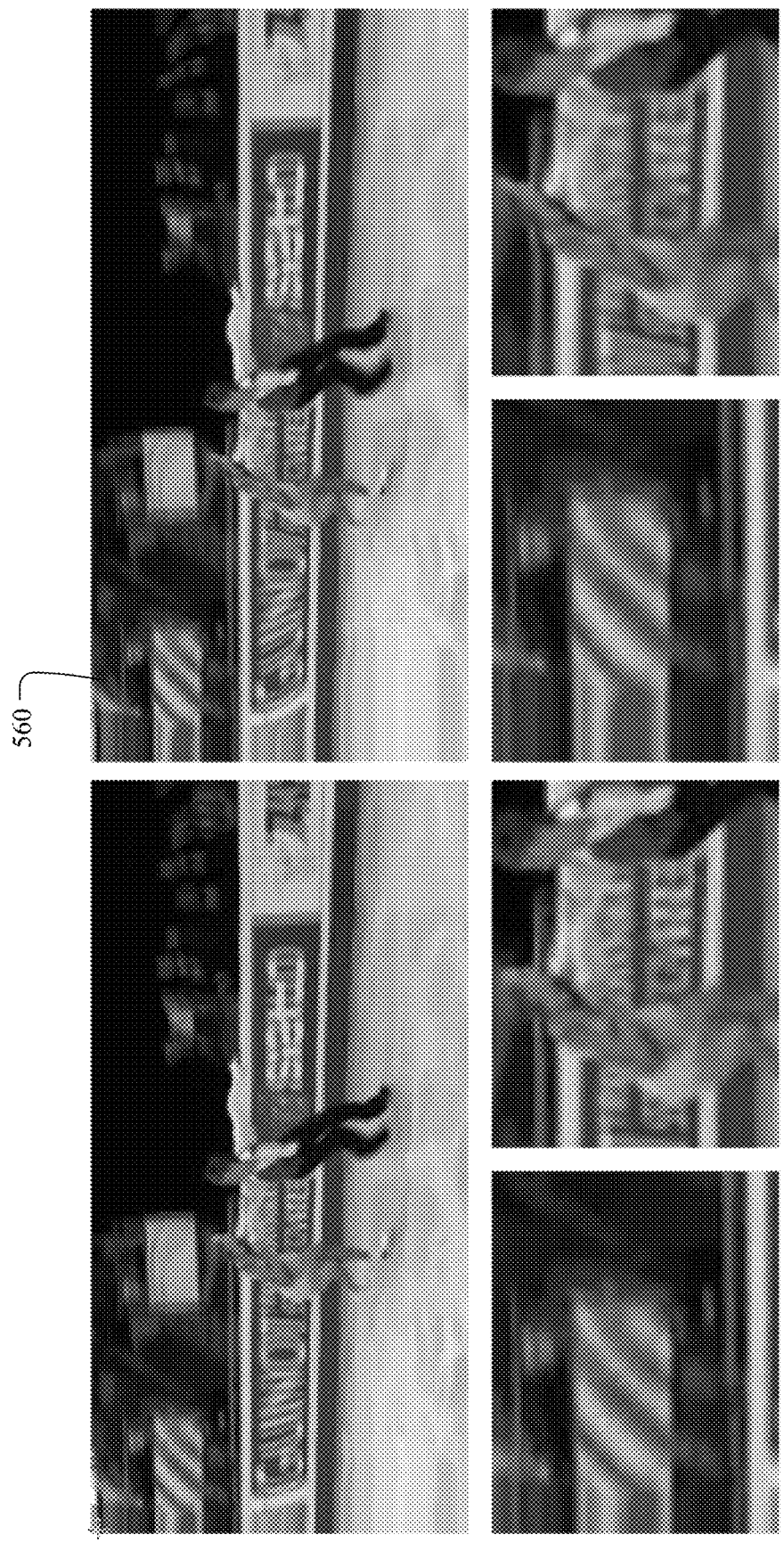
Figure 5G:
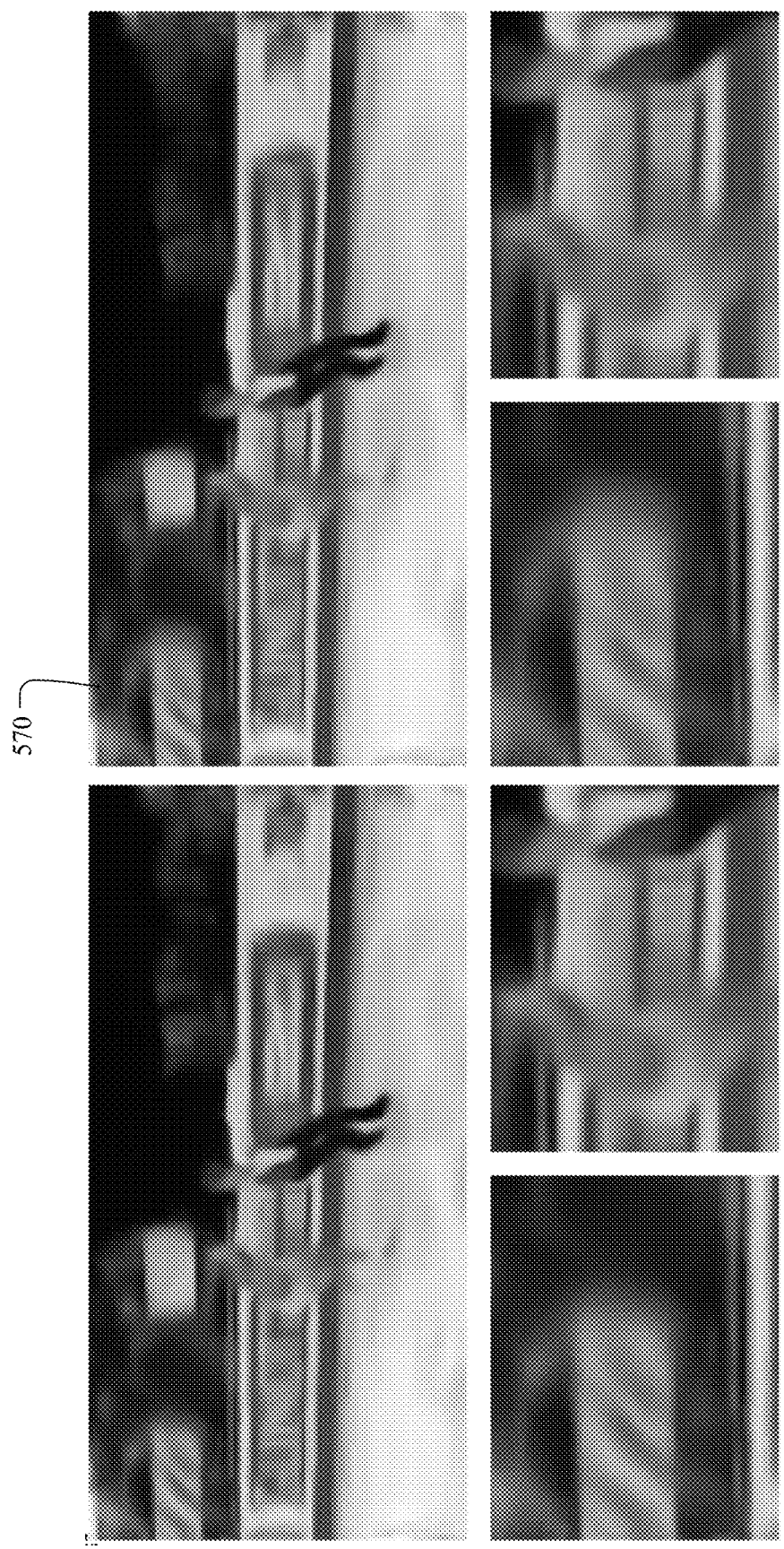
Figure 5H:
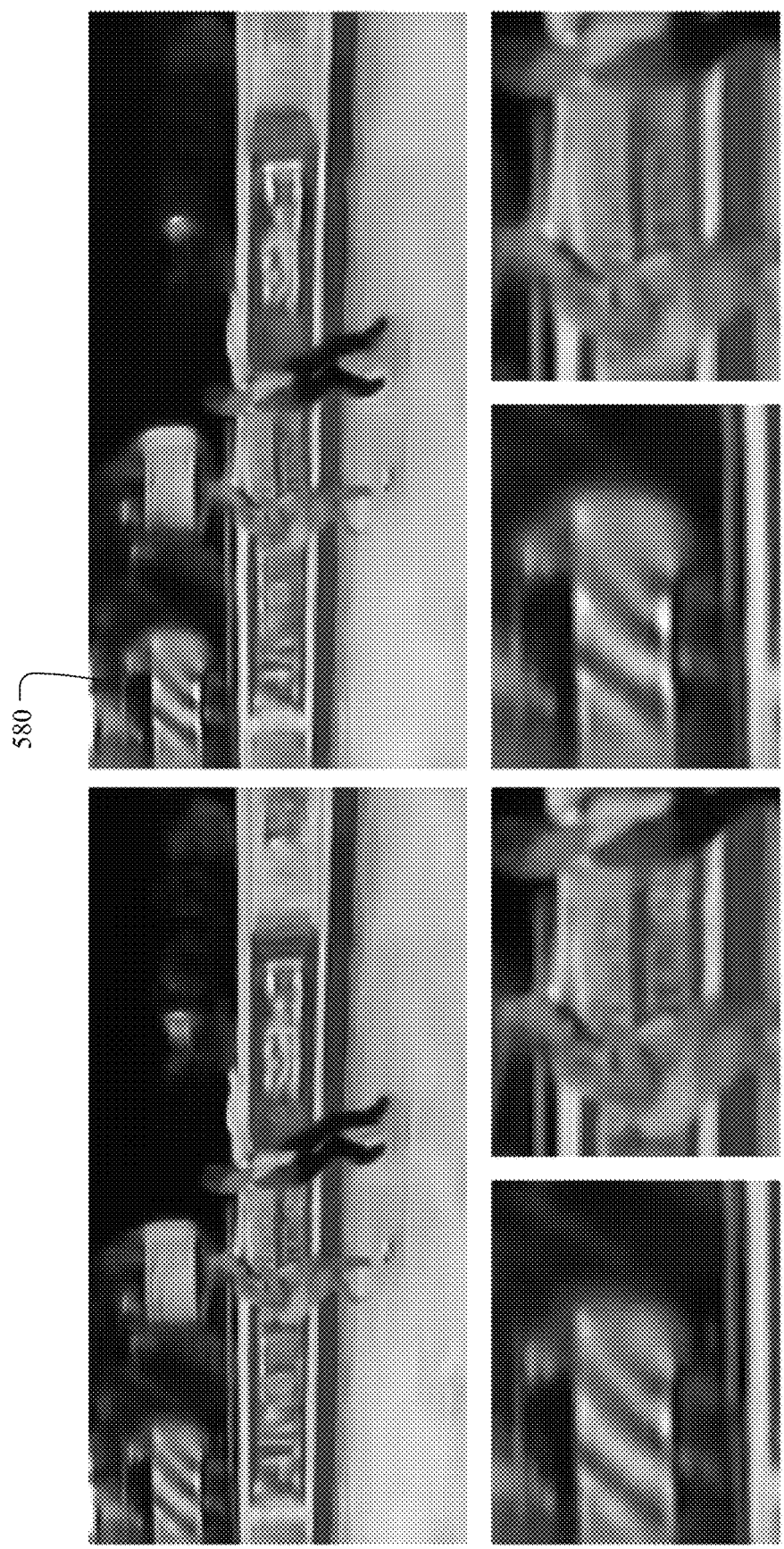

416 that are taken from video of a game of pool, an $l_1$ norm result 418, a GDL result 420, a ground truth result 422, an $l_2$ norm result 424, an adversarial result 426, and a combined adversarial and GDL result 428. FIGS. 4E and 4F show four input frames 430 that are taken from video of a person on a unicycle, an $l_l$ norm result 432, a GDL result 434, a ground truth result 436, an $l_2$ norm result 438, an adversarial result 440, and a combined adversarial and GDL result 442.

Also described herein are the results of comparing the PSNR and SSIM values (with respect to target images FIGS. 5A and 5E) for various embodiments described herein (FIGS. 5B, 5D, 5F, 5H) with respect to results of existing techniques (FIGS. 5C and 5G) on the basketball dunk and ice dancing clips from UCF101. Specifically, FIGS. 5A-5D show frames 510 of the basketball dunk clip for prediction 520 using a constant optical flow (with resulting PSNR=25.4 (18.9) and SSIM=0.88 (0.56)), in comparison with the Ranzato prediction result 530, in comparison with the Adv+GDL+$l_1$ result 540. In addition, FIGS. 5E-5H show frames 550 of the ice dancing clip for prediction 560 using a constant optical flow (with resulting PSNR=24.7 (20.6) and SSIM=0.84 (0.72)), in comparison with the Ranzato prediction result 570, in comparison with the Adv+GDL+1 result 580. To obtain grayscale images, particular embodiments make RGB predictions and extract the Y channel of our Adv+GDL model. Two frame predictions are shown for each method along with a 2× zoom of each image. The PSNR and SSIM values are computed in the moving areas of the images, which comprise more than the ⅔ of the pixels in these example frames. The values in parentheses correspond to the second frame prediction measures.

Experimental Results (8 Frames×8 Frames and 32×32 Patches)

Described herein is the result of training the different multi-scale models, architecture described in Table 3, with 8 input frames to predict 8 frames simultaneously.

TABLE 3

Network architecture
Models 8 frames in input-8 frames in output

| Generative network scales | $G_1$ | $G_2$ | $G_3$ | $G_4$ |
|---|---|---|---|---|
| Number of feature maps | 16, 32, 64 | 16, 32, 64 | 32, 64, 128 | 32, 64, 128, 128 |
| Conv. kernel size | 3, 3, 3, 3 | 5, 3, 3, 3 | 5, 5, 5, 5 | 7, 5, 5, 5, 5 |
| Adversarial network scales | $D_1$ | $D_2$ | $D_3$ | $D_4$ |
| Number of feature maps | 16 | 16, 32, 32 | 32, 64, 64 | 32, 64, 128, 128 |
| Conv. kernel size (no padding) | 3 | 3, 3, 3 | 5, 5, 5 | 7, 7, 5, 5 |
| Fully connected | 128, 64 | 256, 128 | 256, 128 | 256, 128 |

Image similarity measures are given between the ground truth and the predictions in Table 4:

TABLE 4

Comparison of the accuracy of the predictions on 10% of the UCF101 test images. The different models have been trained given 8 frames to predict the 8 next ones.

| | 1$^{st}$ frame prediction scores | | | 8$^{th}$ frame prediction scores | | |
|---|---|---|---|---|---|---|
| | Similarity | | | Similarity | | |
| | PSNR | SSIM | Sharpness | PSNR | SSIM | Sharpness |
| $l_2$ | 18.3 | 0.59 | 17.5 | 15.4 | 0.51 | 17.4 |
| Adv | 21.1 | 0.61 | 17.6 | 17.1 | 0.52 | 17.4 |
| $l_1$ | 21.3 | 0.66 | 17.7 | 17.0 | 0.55 | 17.5 |

TABLE 4-continued

Comparison of the accuracy of the predictions on 10% of the UCF101 test images. The different models have been trained given 8 frames to predict the 8 next ones.

| | 1$^{st}$ frame prediction scores | | | 8$^{th}$ frame prediction scores | | |
|---|---|---|---|---|---|---|
| | Similarity | | | Similarity | | |
| | PSNR | SSIM | Sharpness | PSNR | SSIM | Sharpness |
| GDL $l_1$ | 21.4 | 0.69 | 17.9 | 17.7 | 0.58 | 17.5 |
| Last input | 30.6 | 0.90 | 22.3 | 21.0 | 0.74 | 18.5 |

As shown above, for the first and eighth predicted frames, the numbers indicate that all strategies perform better than the $l_2$ predictions in terms of PSNR and sharpness. The $l_1$ model, by replacing the mean intensity by the median value in individual pixel predictions, may improve results. The adversarial predictions may lead to further gains, and finally the GDL may allow the predictions to achieve the best PNSR and sharpness. In particular embodiments, the size of the network employed in the simultaneous prediction configuration is smaller than in the unique frame prediction setting.

Figure 6A:
FIGS. 6A-6D illustrate a generational results of 8×8 frames and 32×32 patches.
Figure 6B:

FIGS. 6A and 6B together show a generation result (on a UCF101 video) of eight frames simultaneously, using a large version of the GDL $ll_1$ model in which all the number of feature maps were multiplied by four. The top row 610 and 614 of images across both FIGS. 6A and 6B illustrates various target frames; the bottom row of images 612 and 616 across both FIGS. 6A and 6B illustrates predictions generated using embodiments described herein. In particular embodiments, compared to recursive frame prediction, predicting several inputs simultaneously may lead to better long-term results but worse short-term ones. The gap between the two performances may be reduced by the design of time multi-scale strategies.

Figure 6C:
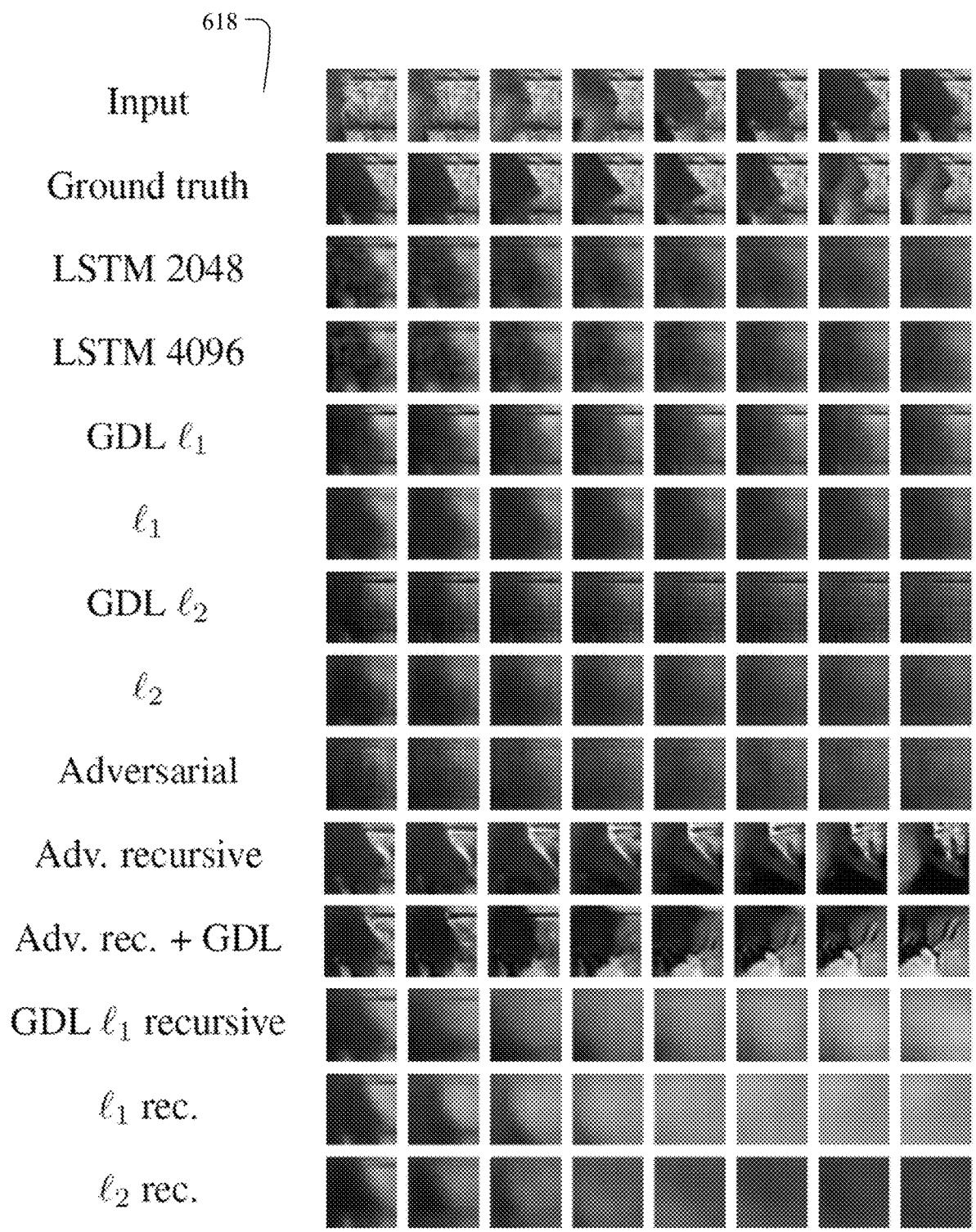
Figure 6D:
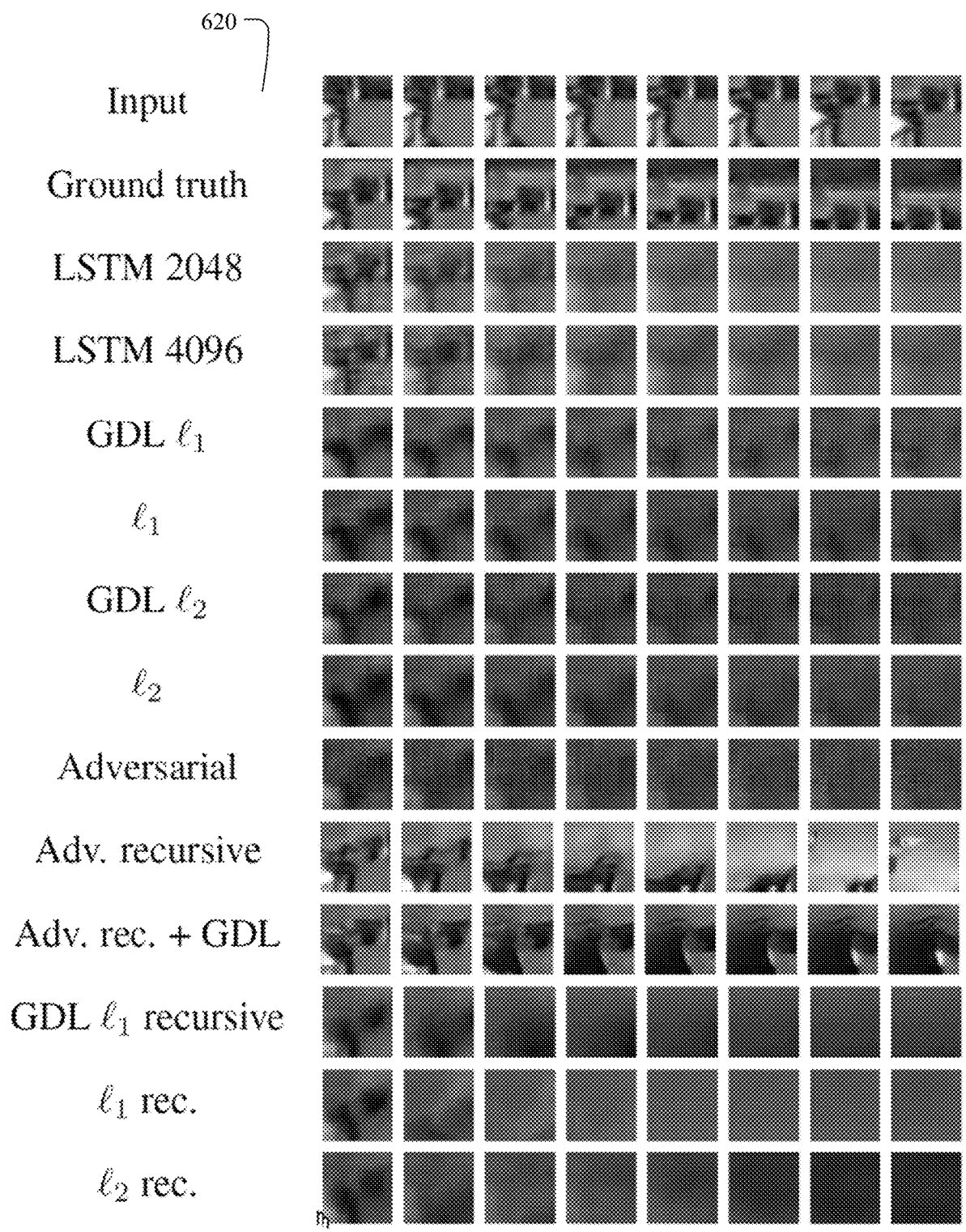

FIGS. 6C and 6D show a comparison of different methods 618 and 620 to predict 32×32 patches from UCF101, with predictions based on LSTMs using sequences of patches. In particular embodiments, the model ranking established on UCF101 in terms of sharpness and PSNR may remain unchanged on the two sequences. When employing the setting 8 inputs→8 outputs described in Table 3, the LSTM first frame prediction may appear sharper than a predicted frame, however when looking at a longer term future, predicted frames based on the gradient difference loss may lead to sharper results. In particular embodiments, by comparing visually the GDL $l_1$ and GDL $l_2$, the predictions appear to have a "chessboard" effect in the $l_2$ case. On the other hand, when employing the recursive strategy (4 inputs, 1 output), the adversarial training may lead to much sharper predictions. While it may not look like anything close to the ground truth on the long term, but it may remain realistic.

Particular embodiments deal with the evaluation of the classification performances of the learned representations in a weakly supervised context, for instance on the UCF101 dataset. Another extension of this work could be the combination of the current system with optical flow predictions. Alternatively, particular embodiments may replace optical flow predictions in applications that do not explicitly require optical flow but rather next frame predictions (e.g., causal (where the next frame is unknown) segmentation of video streams).

As discussed above, the model described in Table 1 was trained with the different losses to predict one frame from the four previous ones. Table 5 shows similarity (PSNR and SSIM) and sharpness measures between the different tested models predictions and frame to predict. In particular embodiments, the evaluation may be performed on the full images but may not be really meaningful because predicting the future location of static pixels is most accurately done by copying the last input frame.

TABLE 5

Comparison of the accuracy of the predictions on 10% of the UCF101 test images. The different models have been trained given 4 frames to predict the next one. Similarity and sharpness measures on full images.

|  | 1$^{st}$ frame prediction scores | | | 2$^{nd}$ frame prediction scores | | |
| --- | --- | --- | --- | --- | --- | --- |
|  | Similarity | | | Similarity | | |
|  | PSNR | SSIM | Sharpness | PSNR | SSIM | Sharpness |
| single sc. $l_2$ | 19.0 | 0.59 | 17.8 | 14.2 | 0.48 | 17.5 |
| $l_2$ | 20.1 | 0.64 | 17.8 | 14.1 | 0.50 | 17.4 |
| $l_1$ | 22.3 | 0.74 | 18.5 | 16.0 | 0.56 | 17.6 |
| GDL $l_1$ | 23.9 | 0.80 | 18.7 | 18.6 | 0.64 | 17.7 |
| Adv | 24.4 | 0.77 | 18.7 | 18.9 | 0.59 | 17.3 |
| Adv + GDL | 27.2 | 0.83 | 19.6 | 22.6 | 0.72 | 18.5 |
| Adv + GDL fine-tuned | 29.6 | 0.90 | 20.3 | 26.0 | 0.83 | 19.4 |
| Last input | 30.0 | 0.90 | 22.1 | 25.8 | 0.84 | 20.3 |

Systems and Methods

Figure 7:
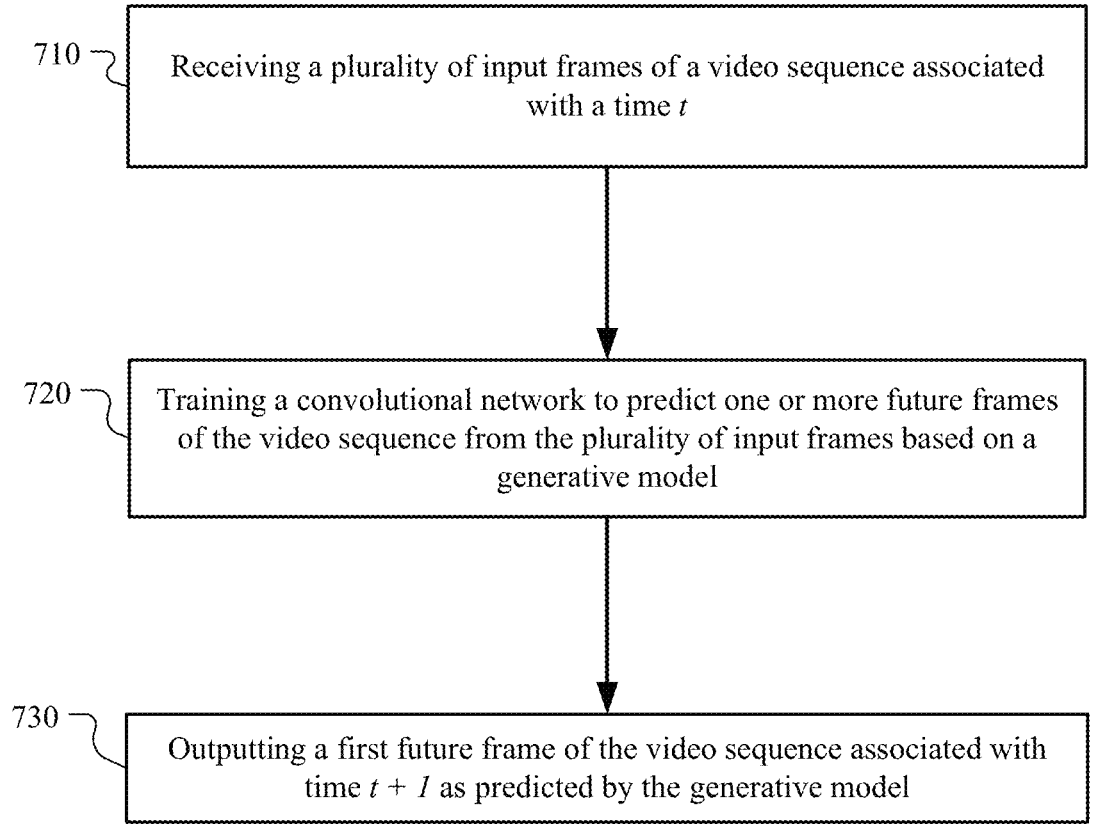
FIG. 7 illustrates an example method for predicting future images from a video sequence.

FIG. 7 illustrates an example method 700 for predicting future images from a video sequence. The method may begin at step 710, where a computing device may receive a plurality of input frames of a video sequence associated with a time t. At step 720, the computing device may train a convolutional network to predict one or more future frames of the video sequence from the plurality of input frames based on a generative model. The training may comprise using an adversarial model and an image gradient difference loss model. The training may comprise randomly selecting temporal sequences of a n×m grid of pixels from the plurality of input frames exhibiting a threshold of optical flow. At step 730, the computing device may output a first future frame of the video sequence associated with a time t+1 as predicted by the generative model. In particular embodiments, the computing device may predict a second future frame of the video sequence associated with time t+2 by using the first future frame as an input frame of the video sequence, recursively apply the generative model based on the first future frame, and outputting the second future frame of the video sequence associated with the time t+2 as predicted by the generative model. In particular embodiments, the threshold of optical flow may be determined based on a comparison of movement in the n×m grid of pixels between a time t−1 and the time t. In particular embodiments, the comparison of movement may comprise comparing pixel intensity associated with each pixel of the n×m grid of pixels between the time t−1 and the time t and calculating a similarity measure based on compared pixel intensities. In particular embodiments, the training of the convolutional network may further comprise evaluating a quality of the predicted one or more future frames of the video sequence by calculating a peak-signal-to-noise ratio between the one or more future frames of the video sequence and a ground truth frame of the video sequence. In particular embodiments, the training of the convolutional network may further comprise evaluating a quality of the predicted one or more future frames of the video sequence by calculating a structural similarity index measure between the one or more future frames of the video sequence and a ground truth frame of the video sequence. Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for predicting future images from a video sequence including the particular steps of the method of FIG. 7, this disclosure contemplates any suitable method for predicting future images from a video sequence including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
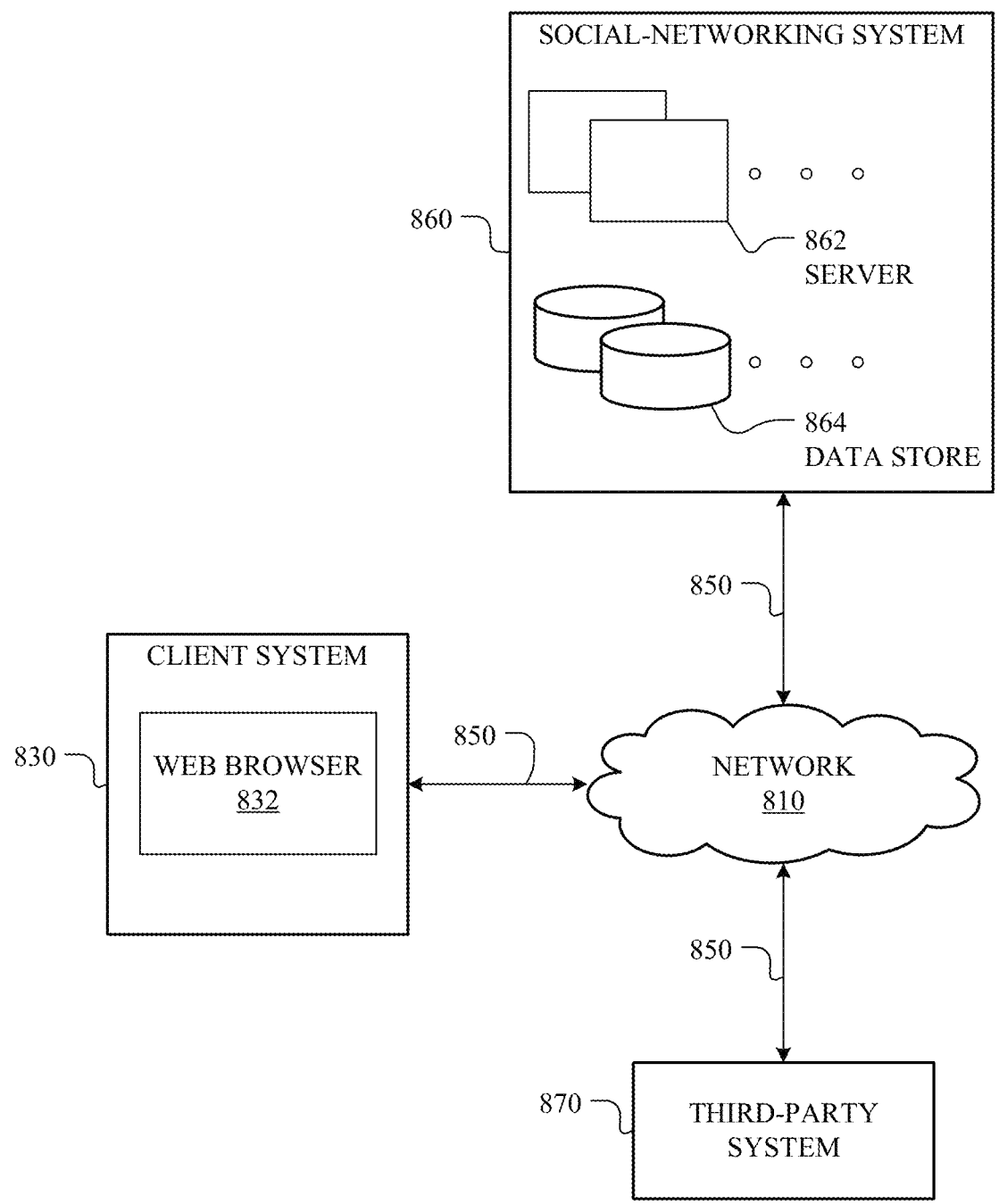
FIG. 8 illustrates an example network environment associated with a social-networking system.

FIG. 8 illustrates an example network environment 800 associated with a social-networking system. Network environment 800 includes a client system 830, a social-networking system 860, and a third-party system 870 connected to each other by a network 810. Although FIG. 8 illustrates a particular arrangement of client system 830, social-networking system 860, third-party system 870, and network 810, this disclosure contemplates any suitable arrangement of client system 830, social-networking system 860, third-party system 870, and network 810. As an example and not by way of limitation, two or more of client system 830, social-networking system 860, and third-party system 870 may be connected to each other directly, bypassing network 810. As another example, two or more of client system 830, social-networking system 860, and third-party system 870 may be physically or logically co-located with each other in whole or in part. Moreover, although FIG. 8 illustrates a particular number of client systems 830, social-networking systems 860, third-party systems 870, and networks 810, this disclosure contemplates any suitable number of client systems 830, social-networking systems 860, third-party systems 870, and networks 810. As an example and not by way of limitation, network environment 800 may include multiple client system 830, social-networking systems 860, third-party systems 870, and networks 810.

This disclosure contemplates any suitable network 810. As an example and not by way of limitation, one or more portions of network 810 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 810 may include one or more networks 810.

Links 850 may connect client system 830, social-networking system 860, and third-party system 870 to communication network 810 or to each other. This disclosure contemplates any suitable links 850. In particular embodiments, one or more links 850 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 850 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 850, or a combination of two or more such links 850. Links 850 need not necessarily be the same throughout network environment 800. One or more first links 850 may differ in one or more respects from one or more second links 850.

In particular embodiments, client system 830 may be an electronic device including hardware, software, or embedded logic components or a combination of two or more such components and capable of carrying out the appropriate functionalities implemented or supported by client system 830. As an example and not by way of limitation, a client system 830 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 830. A client system 830 may enable a network user at client system 830 to access network 810. A client system 830 may enable its user to communicate with other users at other client systems 830.

In particular embodiments, client system 830 may include a web browser 832, and may have one or more add-ons, plug-ins, or other extensions. A user at client system 830 may enter a Uniform Resource Locator (URL) or other address directing the web browser 832 to a particular server (such as server 862, or a server associated with a third-party system 870), and the web browser 832 may generate a Hyper Text Transfer Protocol (HTTP) request and communicate the HTTP request to server. The server may accept the HTTP request and communicate to client system 830 one or more Hyper Text Markup Language (HTML) files responsive to the HTTP request. Client system 830 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 860 may be a network-addressable computing system that can host an online social network. Social-networking system 860 may generate, store, receive, and send social-networking data, such as, for example, user-profile data, concept-profile data, social-graph information, or other suitable data related to the online social network. Social-networking system 860 may be accessed by the other components of network environment 800 either directly or via network 810. As an example and not by way of limitation, client system 830 may access social-networking system 860 using a web browser 832, or a native application associated with social-networking system 860 (e.g., a mobile social-networking application, a messaging application, another suitable application, or any combination thereof) either directly or via network 810. In particular embodiments, social-networking system 860 may include one or more servers 862. Each server 862 may be a unitary server or a distributed server spanning multiple computers or multiple datacenters. Servers 862 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 862 may include hardware, software, or embedded logic components or a combination of two or more such components for carrying out the appropriate functionalities implemented or supported by server 862. In particular embodiments, social-networking system 860 may include one or more data stores 864. Data stores 864 may be used to store various types of information. In particular embodiments, the information stored in data stores 864 may be organized according to specific data structures. In particular embodiments, each data store 864 may be a relational, columnar, correlation, or other suitable database. Although this disclosure describes or illustrates particular types of databases, this disclosure contemplates any suitable types of databases. Particular embodiments may provide interfaces that enable a client system 830, a social-networking system 860, or a third-party system 870 to manage, retrieve, modify, add, or delete, the information stored in data store 864.

In particular embodiments, social-networking system 860 may store one or more social graphs in one or more data stores 864. In particular embodiments, a social graph may include multiple nodes—which may include multiple user nodes (each corresponding to a particular user) or multiple concept nodes (each corresponding to a particular concept)—and multiple edges connecting the nodes. Social-networking system 860 may provide users of the online social network the ability to communicate and interact with other users. In particular embodiments, users may join the online social network via social-networking system 860 and then add connections (e.g., relationships) to a number of other users of social-networking system 860 to whom they want to be connected. Herein, the term "friend" may refer to any other user of social-networking system 860 with whom a user has formed a connection, association, or relationship via social-networking system 860.

In particular embodiments, social-networking system 860 may provide users with the ability to take actions on various types of items or objects, supported by social-networking system 860. As an example and not by way of limitation, the items and objects may include groups or social networks to which users of social-networking system 860 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 860 or by an external system of third-party system 870, which is separate from social-networking system 860 and coupled to social-networking system 860 via a network 810.

In particular embodiments, social-networking system 860 may be capable of linking a variety of entities. As an example and not by way of limitation, social-networking system 860 may enable users to interact with each other as well as receive content from third-party systems 870 or other entities, or to allow users to interact with these entities through an application programming interfaces (API) or other communication channels.

In particular embodiments, a third-party system 870 may include one or more types of servers, one or more data stores, one or more interfaces, including but not limited to APIs, one or more web services, one or more content sources, one or more networks, or any other suitable components, e.g., that servers may communicate with. A third-party system 870 may be operated by a different entity from an entity operating social-networking system 860. In particular embodiments, however, social-networking system 860 and third-party systems 870 may operate in conjunction with each other to provide social-networking services to users of social-networking system 860 or third-party systems 870. In this sense, social-networking system 860 may provide a platform, or backbone, which other systems, such as third-party systems 870, may use to provide social-networking services and functionality to users across the Internet.

In particular embodiments, a third-party system 870 may include a third-party content object provider. A third-party content object provider may include one or more sources of content objects, which may be communicated to a client system 830. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 860 also includes user-generated content objects, which may enhance a user's interactions with social-networking system 860. User-generated content may include anything a user can add, upload, send, or "post" to social-networking system 860. As an example and not by way of limitation, a user communicates posts to social-networking system 860 from a client system 830. Posts may include data such as status updates or other textual data, location information, photos, videos, links, music or other similar data or media. Content may also be added to social-networking system 860 by a third-party through a "communication channel," such as a newsfeed or stream.

In particular embodiments, social-networking system 860 may include a variety of servers, sub-systems, programs, modules, logs, and data stores. In particular embodiments, social-networking system 860 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 860 may also include suitable components such as network interfaces, security mechanisms, load balancers, failover servers, management-and-network-operations consoles, other suitable components, or any suitable combination thereof. In particular embodiments, social-networking system 860 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 860 to one or more client systems 830 or one or more third-party system 870 via network 810. The web server may include a mail server or other messaging functionality for receiving and routing messages between social-networking system 860 and one or more client systems 830. An API-request server may allow a third-party system 870 to access information from social-networking system 860 by calling one or more APIs. An action logger may be used to receive communications from a web server about a user's actions on or off social-networking system 860. In conjunction with the action log, a third-party-content-object log may be maintained of user exposures to third-party-content objects. A notification controller may provide information regarding content objects to a client system 830. Information may be pushed to a client system 830 as notifications, or information may be pulled from client system 830 responsive to a request received from client system 830. Authorization servers may be used to enforce one or more privacy settings of the users of social-networking system 860. A privacy setting of a user determines how particular information associated with a user can be shared. The authorization server may allow users to opt in to or opt out of having their actions logged by social-networking system 860 or shared with other systems (e.g., third-party system 870), such as, for example, by setting appropriate privacy settings. Third-party-content-object stores may be used to store content objects received from third parties, such as a third-party system 870. Location stores may be used for storing location information received from client systems 830 associated with users. Advertisement-pricing modules may combine social information, the current time, location information, or other suitable information to provide relevant advertisements, in the form of notifications, to a user.

Figure 9:
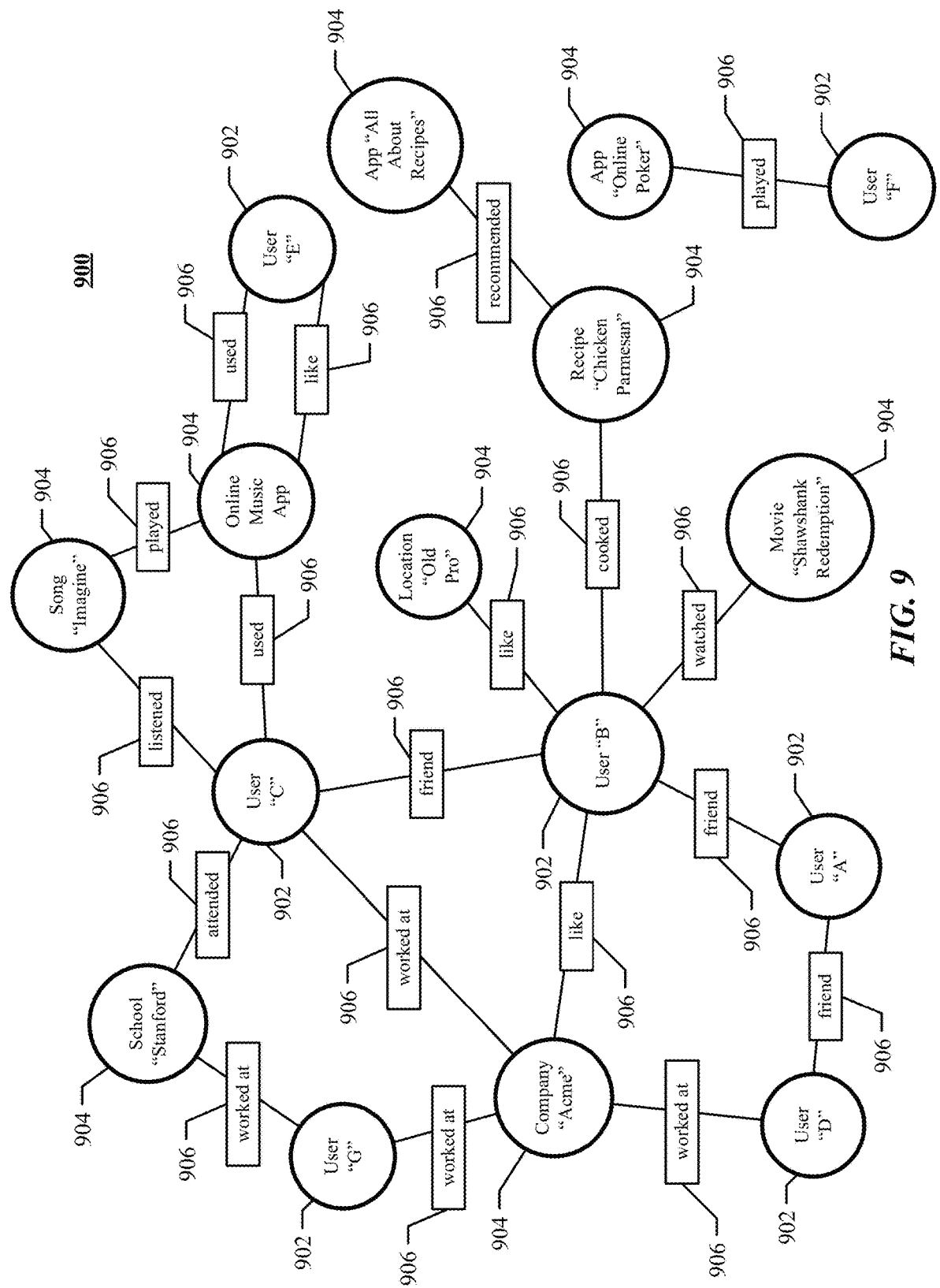
FIG. 9 illustrates an example social graph.

FIG. 9 illustrates example social graph 900. In particular embodiments, social-networking system 860 may store one or more social graphs 900 in one or more data stores. In particular embodiments, social graph 900 may include multiple nodes—which may include multiple user nodes 902 or multiple concept nodes 904—and multiple edges 906 connecting the nodes. Example social graph 900 illustrated in FIG. 9 is shown, for didactic purposes, in a two-dimensional visual map representation. In particular embodiments, a social-networking system 860, client system 830, or third-party system 870 may access social graph 900 and related social-graph information for suitable applications. The nodes and edges of social graph 900 may be stored as data objects, for example, in a data store (such as a social-graph database). Such a data store may include one or more searchable or queryable indexes of nodes or edges of social graph 900.

In particular embodiments, a user node 902 may correspond to a user of social-networking system 860. As an example and not by way of limitation, a user may be an individual (human user), an entity (e.g., an enterprise, business, or third-party application), or a group (e.g., of individuals or entities) that interacts or communicates with or over social-networking system 860. In particular embodiments, when a user registers for an account with social-networking system 860, social-networking system 860 may create a user node 902 corresponding to the user, and store the user node 902 in one or more data stores. Users and user nodes 902 described herein may, where appropriate, refer to registered users and user nodes 902 associated with registered users. In addition or as an alternative, users and user nodes 902 described herein may, where appropriate, refer to users that have not registered with social-networking system 860. In particular embodiments, a user node 902 may be associated with information provided by a user or information gathered by various systems, including social-networking system 860. As an example and not by way of limitation, a user may provide his or her name, profile picture, contact information, birth date, sex, marital status, family status, employment, education background, preferences, interests, or other demographic information. In particular embodiments, a user node 902 may be associated with one or more data objects corresponding to information associated with a user. In particular embodiments, a user node 902 may correspond to one or more webpages.

In particular embodiments, a concept node 904 may correspond to a concept. As an example and not by way of limitation, a concept may correspond to a place (such as, for example, a movie theater, restaurant, landmark, or city); a website (such as, for example, a website associated with social-network system 860 or a third-party website associated with a web-application server); an entity (such as, for example, a person, business, group, sports team, or celebrity); a resource (such as, for example, an audio file, video file, digital photo, text file, structured document, or application) which may be located within social-networking system 860 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 904 may be associated with information of a concept provided by a user or information gathered by various systems, including social-networking system 860. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 904 may be associated with one or more data objects corresponding to information associated with concept node 904. In particular embodiments, a concept node 904 may correspond to one or more webpages.

In particular embodiments, a node in social graph 900 may represent or be represented by a webpage (which may be referred to as a "profile page"). Profile pages may be hosted by or accessible to social-networking system 860. Profile pages may also be hosted on third-party websites associated with a third-party system 870. As an example and not by way of limitation, a profile page corresponding to a particular external webpage may be the particular external webpage and the profile page may correspond to a particular concept node 904. Profile pages may be viewable by all or a selected subset of other users. As an example and not by way of limitation, a user node 902 may have a corresponding user-profile page in which the corresponding user may add content, make declarations, or otherwise express himself or herself. As another example and not by way of limitation, a concept node 904 may have a corresponding concept-profile page in which one or more users may add content, make declarations, or express themselves, particularly in relation to the concept corresponding to concept node 904.

In particular embodiments, a concept node 904 may represent a third-party webpage or resource hosted by a third-party system 870. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 830 to send to social-networking system 860 a message indicating the user's action. In response to the message, social-networking system 860 may create an edge (e.g., a check-in-type edge) between a user node 902 corresponding to the user and a concept node 904 corresponding to the third-party webpage or resource and store edge 906 in one or more data stores.

In particular embodiments, a pair of nodes in social graph 900 may be connected to each other by one or more edges 906. An edge 906 connecting a pair of nodes may represent a relationship between the pair of nodes. In particular embodiments, an edge 906 may include or represent one or more data objects or attributes corresponding to the relationship between a pair of nodes. As an example and not by way of limitation, a first user may indicate that a second user is a "friend" of the first user. In response to this indication, social-networking system 860 may send a "friend request" to the second user. If the second user confirms the "friend request," social-networking system 860 may create an edge 906 connecting the first user's user node 902 to the second user's user node 902 in social graph 900 and store edge 906 as social-graph information in one or more of data stores 864. In the example of FIG. 9, social graph 900 includes an edge 906 indicating a friend relation between user nodes 902 of user "A" and user "B" and an edge indicating a friend relation between user nodes 902 of user "C" and user "B." Although this disclosure describes or illustrates particular edges 906 with particular attributes connecting particular user nodes 902, this disclosure contemplates any suitable edges 906 with any suitable attributes connecting user nodes 902. As an example and not by way of limitation, an edge 906 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 900 by one or more edges 906.

In particular embodiments, an edge 906 between a user node 902 and a concept node 904 may represent a particular action or activity performed by a user associated with user node 902 toward a concept associated with a concept node 904. As an example and not by way of limitation, as illustrated in FIG. 9, a user may "like," "attended," "played," "listened," "cooked," "worked at," or "watched" a concept, each of which may correspond to an edge type or subtype. A concept-profile page corresponding to a concept node 904 may include, for example, a selectable "check in" icon (such as, for example, a clickable "check in" icon) or a selectable "add to favorites" icon. Similarly, after a user clicks these icons, social-networking system 860 may create a "favorite" edge or a "check in" edge in response to a user's action corresponding to a respective action. As another example and not by way of limitation, a user (user "C") may listen to a particular song ("Imagine") using a particular application (a third-party online music application). In this case, social-networking system 860 may create a "listened" edge 906 and a "used" edge (as illustrated in FIG. 9) between user nodes 902 corresponding to the user and concept nodes 904 corresponding to the song and application to indicate that the user listened to the song and used the application. Moreover, social-networking system 860 may create a "played" edge 906 (as illustrated in FIG. 9) between concept nodes 904 corresponding to the song and the application to indicate that the particular song was played by the particular application. In this case, "played" edge 906 corresponds to an action performed by an external application (e.g., a third-party online music application) on an external audio file (the song "Imagine"). Although this disclosure describes particular edges 906 with particular attributes connecting user nodes 902 and concept nodes 904, this disclosure contemplates any suitable edges 906 with any suitable attributes connecting user nodes 902 and concept nodes 904. Moreover, although this disclosure describes edges between a user node 902 and a concept node 904 representing a single relationship, this disclosure contemplates edges between a user node 902 and a concept node 904 representing one or more relationships. As an example and not by way of limitation, an edge 906 may represent both that a user likes and has used at a particular concept. Alternatively, another edge 906 may represent each type of relationship (or multiples of a single relationship) between a user node 902 and a concept node 904 (as illustrated in FIG. 9 between user node 902 for user "E" and concept node 904 for "online music app").

In particular embodiments, social-networking system 860 may create an edge 906 between a user node 902 and a concept node 904 in social graph 900. As an example and not by way of limitation, a user viewing a concept-profile page (such as, for example, by using a web browser or a special-purpose application hosted by the user's client system 830) may indicate that he or she likes the concept represented by the concept node 904 by clicking or selecting a "Like" icon, which may cause the user's client system 830 to send to social-networking system 860 a message indicating the user's liking of the concept associated with the concept-profile page. In response to the message, social-networking system 860 may create an edge 906 between user node 902 associated with the user and concept node 904, as illustrated by "like" edge 906 between the user and concept node 904. In particular embodiments, social-networking system 860 may store an edge 906 in one or more data stores. In particular embodiments, an edge 906 may be automatically formed by social-networking system 860 in response to a particular user action. As an example and not by way of limitation, if a first user uploads a picture, watches a movie, or listens to a song, an edge 906 may be formed between user node 902 corresponding to the first user and concept nodes 904 corresponding to those concepts. Although this disclosure describes forming particular edges 906 in particular manners, this disclosure contemplates forming any suitable edges 906 in any suitable manner.

In particular embodiments, an advertisement may be text (which may be HTML-linked), one or more images (which may be HTML-linked), one or more videos, audio, other suitable digital object files, a suitable combination of these, or any other suitable advertisement in any suitable digital format presented on one or more web pages, in one or more e-mails, or in connection with search results requested by a user. In addition or as an alternative, an advertisement may be one or more sponsored stories (e.g., a news-feed or ticker item on social-networking system 860). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. The social action may be promoted within or on social-networking system 860. In addition or as an alternative, the social action may be promoted outside or off of social-networking system 860, where appropriate. In particular embodiments, a page may be an on-line presence (such as a webpage or website within or outside of social-networking system 860) of a business, organization, or brand facilitating its sharing of stories and connecting with people. A page may be customized, for example, by adding applications, posting stories, or hosting events.

A sponsored story may be generated from stories in users' news feeds and promoted to specific areas within displays of users' web browsers when viewing a web page associated with social-networking system 860. Sponsored stories are more likely to be viewed by users, at least in part because sponsored stories generally involve interactions or suggestions by the users' friends, fan pages, or other connections. In connection with sponsored stories, particular embodiments may utilize one or more systems, components, elements, functions, methods, operations, or steps disclosed in U.S. patent application Ser. No. 13/327,557, entitled "Sponsored Stories Unit Creation from Organic Activity Stream" and filed 15 Dec. 2011, U.S. Patent Application Publication No. 2012/0203831, entitled "Sponsored Stories Unit Creation from Organic Activity Stream" and filed 3 Feb. 2012 as U.S. patent application Ser. No. 13/020,745, or U.S. Patent Application Publication No. 2012/0233009, entitled "Endorsement Subscriptions for Sponsored Stories" and filed 9 Mar. 2011 as U.S. patent application Ser. No. 13/044,506, which are all incorporated herein by reference as an example and not by way of limitation. In particular embodiments, sponsored stories may utilize computer-vision algorithms to detect products in uploaded images or photos lacking an explicit connection to an advertiser as disclosed in U.S. patent application Ser. No. 13/212,356, entitled "Computer-Vision Content Detection for Sponsored Stories" and filed 18 Aug. 2011, which is incorporated herein by reference as an example and not by way of limitation.

As described above, an advertisement may be text (which may be HTML-linked), one or more images (which may be HTML-linked), one or more videos, audio, one or more ADOBE FLASH files, a suitable combination of these, or any other suitable advertisement in any suitable digital format. In particular embodiments, an advertisement may be requested for display within third-party webpages, social-networking-system webpages, or other pages. An advertisement may be displayed in a dedicated portion of a page, such as in a banner area at the top of the page, in a column at the side of the page, in a GUI of the page, in a pop-up window, over the top of content of the page, or elsewhere with respect to the page. In addition or as an alternative, an advertisement may be displayed within an application or within a game. An advertisement may be displayed within dedicated pages, requiring the user to interact with or watch the advertisement before the user may access a page, utilize an application, or play a game. The user may, for example view the advertisement through a web browser.

A user may interact with an advertisement in any suitable manner. The user may click or otherwise select the advertisement, and the advertisement may direct the user (or a browser or other application being used by the user) to a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). In particular embodiments, an advertisement may include one or more games, which a user or other application may play in connection with the advertisement. An advertisement may include functionality for responding to a poll or question in the advertisement.

An advertisement may include social-networking-system functionality that a user may interact with. For example, an advertisement may enable a user to "like" or otherwise endorse the advertisement by selecting an icon or link associated with endorsement. Similarly, a user may share the advertisement with another user (e.g., through social-networking system 860) or RSVP (e.g., through social-networking system 860) to an event associated with the advertisement. In addition or as an alternative, an advertisement may include social-networking-system content directed to the user. For example, an advertisement may display information about a friend of the user within social-networking system 860 who has taken an action associated with the subject matter of the advertisement.

Social-networking-system functionality or content may be associated with an advertisement in any suitable manner. For example, an advertising system (which may include hardware, software, or both for receiving bids for advertisements and selecting advertisements in response) may retrieve social-networking functionality or content from social-networking system 860 and incorporate the retrieved social-networking functionality or content into the advertisement before serving the advertisement to a user. Examples of selecting and providing social-networking-system functionality or content with an advertisement are disclosed in U.S. Patent Application Publication No. 2012/0084160, entitled "Providing Social Endorsements with Online Advertising" and filed 5 Oct. 2010 as U.S. patent application Ser. No. 12/898,662, and in U.S. Patent Application Publication No. 2012/0232998, entitled "Selecting Social Endorsement Information for an Advertisement for Display to a Viewing User" and filed 8 Mar. 2011 as U.S. patent application Ser. No. 13/043,424, which are both incorporated herein by reference as examples only and not by way of limitation. Interacting with an advertisement that is associated with social-networking-system functionality or content may cause information about the interaction to be displayed in a profile page of the user in social-networking-system 860.

Particular embodiments may facilitate the delivery of advertisements to users that are more likely to find the advertisements more relevant or useful. For example, an advertiser may realize higher conversion rates (and therefore higher return on investment (ROI) from advertising) by identifying and targeting users that are more likely to find its advertisements more relevant or useful. The advertiser may use user-profile information in social-networking system 860 to identify those users. In addition or as an alternative, social-networking system 860 may use user-profile information in social-networking system 860 to identify those users for the advertiser. As examples and not by way of limitation, particular embodiments may target users with the following: invitations or suggestions of events; suggestions regarding coupons, deals, or wish-list items; suggestions regarding friends' life events; suggestions regarding groups; advertisements; or social advertisements. Such targeting may occur, where appropriate, on or within social-networking system 860, off or outside of social-networking system 860, or on mobile computing devices of users. When on or within social-networking system 860, such targeting may be directed to users' news feeds, search results, e-mail or other in-boxes, or notifications channels or may appear in particular area of web pages of social-networking system 860, such as a right-hand side of a web page in a concierge or grouper area (which may group along a right-hand rail advertisements associated with the same concept, node, or object) or a network-ego area (which may be based on what a user is viewing on the web page and a current news feed of the user). When off or outside of social-networking system 860, such targeting may be provided through a third-party website, e.g., involving an ad exchange or a social plug-in. When on a mobile computing device of a user, such targeting may be provided through push notifications to the mobile computing device.

Targeting criteria used to identify and target users may include explicit, stated user interests on social-networking system 860 or explicit connections of a user to a node, object, entity, brand, or page on social-networking system 860. In addition or as an alternative, such targeting criteria may include implicit or inferred user interests or connections (which may include analyzing a user's history, demographic, social or other activities, friends' social or other activities, subscriptions, or any of the preceding of other users similar to the user (based, e.g., on shared interests, connections, or events)). Particular embodiments may utilize platform targeting, which may involve platform and "like" impression data; contextual signals (e.g., "Who is viewing now or has viewed recently the page for [brand-name soda pop]?"); light-weight connections (e.g., "check-ins"); connection lookalikes; fans; extracted keywords; EMU advertising; inferential advertising; coefficients, affinities, or other social-graph information; friends-of-friends connections; pinning or boosting; deals; polls; household income, social clusters or groups; products detected in images or other media; social- or open-graph edge types; geo-prediction; views of profile or pages; status updates or other user posts (analysis of which may involve natural-language processing or keyword extraction); events information; or collaborative filtering. Identifying and targeting users may also include privacy settings (such as user opt-outs), data hashing, or data anonymization, as appropriate.

To target users with advertisements, particular embodiments may utilize one or more systems, components, elements, functions, methods, operations, or steps disclosed in the following, which are all incorporated herein by reference as examples and not by way of limitation: U.S. Patent Application Publication No. 2009/0119167, entitled "Social Advertisements and Other Informational Messages on a Social Networking Website and Advertising Model for Same" and filed 18 Aug. 2008 as U.S. patent application Ser. No. 12/193,702; U.S. Patent Application Publication No. 2009/0070219, entitled "Targeting Advertisements in a Social Network" and filed 20 Aug. 2008 as U.S. patent application Ser. No. 12/195,321; U.S. Patent Application Publication No. 2012/0158501, entitled "Targeting Social Advertising to Friends of Users Who Have Interacted With an Object Associated with the Advertising" and filed 15 Dec. 2010 as U.S. patent application Ser. No. 12/968,786; or U.S. Patent Application Publication No. 2012/0166532, entitled "Contextually Relevant Affinity Prediction in a Social-Networking System" and filed 23 Dec. 2010 as U.S. patent application Ser. No. 12/978,265.

An advertisement may be presented or otherwise delivered using plug-ins for web browsers or other applications, iframe elements, news feeds, tickers, notifications (which may include, for example, e-mail, Short Message Service (SMS) messages, or notifications), or other means. An advertisement may be presented or otherwise delivered to a user on a mobile or other computing device of the user. In connection with delivering advertisements, particular embodiments may utilize one or more systems, components, elements, functions, methods, operations, or steps disclosed in the following, which are all incorporated herein by reference as examples and not by way of limitation: U.S. Patent Application Publication No. 2012/0159635, entitled "Comment Plug-In for Third-Party System" and filed 15 Dec. 2010 as U.S. patent application Ser. No. 12/969,368; U.S. Patent Application Publication No. 2012/0158753, entitled "Comment Ordering System" and filed 15 Dec. 2010 as U.S. patent application Ser. No. 12/969,408; U.S. Pat. No. 7,669,123, entitled "Dynamically Providing a News Feed About a User of a Social Network" and filed 11 Aug. 2006 as U.S. patent application Ser. No. 11/503,242; U.S. Pat. No. 8,402,094, entitled "Providing a Newsfeed Based on User Affinity for Entities and Monitored Actions in a Social Network Environment" and filed 11 Aug. 2006 as U.S. patent application Ser. No. 11/503,093; U.S. Patent Application Publication No. 2012/0072428, entitled "Action Clustering for News Feeds" and filed 16 Sep. 2010 as U.S. patent application Ser. No. 12/884,010; U.S. Patent Application Publication No. 2011/0004692, entitled "Gathering Information about Connections in a Social Networking Service" and filed 1 Jul. 2009 as U.S. patent application Ser. No. 12/496,606; U.S. Patent Application Publication No. 2008/0065701, entitled "Method and System for Tracking Changes to User Content in an Online Social Network" and filed 12 Sep. 2006 as U.S. patent application Ser. No. 11/531,154; U.S. Patent Application Publication No. 2008/0065604, entitled "Feeding Updates to Landing Pages of Users of an Online Social Network from External Sources" and filed 17 Jan. 2007 as U.S. patent application Ser. No. 11/624,088; U.S. Pat. No. 8,244,848, entitled "Integrated Social-Network Environment" and filed 19 Apr. 2010 as U.S. patent application Ser. No. 12/763,171; U.S. Patent Application Publication No. 2011/0083101, entitled "Sharing of Location-Based Content Item in Social-Networking Service" and filed 6 Oct. 2009 as U.S. patent application Ser. No. 12/574,614; U.S. Pat. No. 8,150,844, entitled "Location Ranking Using Social-Graph Information" and filed 18 Aug. 2010 as U.S. patent application Ser. No. 12/858,718; U.S. patent application Ser. No. 13/051,286, entitled "Sending Notifications to Users Based on Users' Notification Tolerance Levels" and filed 18 Mar. 2011; U.S. patent application Ser. No. 13/096,184, entitled "Managing Notifications Pushed to User Devices" and filed 28 Apr. 2011; U.S. patent application Ser. No. 13/276,248, entitled "Platform-Specific Notification Delivery Channel" and filed 18 Oct. 2011; or U.S. Patent Application Publication No. 2012/0197709, entitled "Mobile Advertisement with Social Component for Geo-Social Networking System" and filed 1 Feb. 2011 as U.S. patent application Ser. No. 13/019,061. Although this disclosure describes or illustrates particular advertisements being delivered in particular ways and in connection with particular content, this disclosure contemplates any suitable advertisements delivered in any suitable ways and in connection with any suitable content.

In particular embodiments, social-networking system 860 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 870 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 860 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 860 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 860 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 860 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 860 may calculate a coefficient based on a user's actions. Social-networking system 860 may monitor such actions on the online social network, on a third-party system 870, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 860 may calculate a coefficient based on the user's actions with particular types of content. The content may be associated with the online social network, a third-party system 870, or another suitable system. The content may include users, profile pages, posts, news stories, headlines, instant messages, chat room conversations, emails, advertisements, pictures, video, music, other suitable objects, or any combination thereof. Social-networking system 860 may analyze a user's actions to determine whether one or more of the actions indicate an affinity for subject matter, content, other users, and so forth. As an example and not by way of limitation, if a user frequently posts content related to "coffee" or variants thereof, social-networking system 860 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 860 may calculate a coefficient based on the type of relationship between particular objects. Referencing the social graph 900, social-networking system 860 may analyze the number and/or type of edges 906 connecting particular user nodes 902 and concept nodes 904 when calculating a coefficient. As an example and not by way of limitation, user nodes 902 that are connected by a spouse-type edge (representing that the two users are married) may be assigned a higher coefficient than a user nodes 902 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 860 may determine that the user has a higher coefficient with respect to the first photo than the second photo because having a tagged-in-type relationship with content may be assigned a higher weight and/or rating than having a like-type relationship with content. In particular embodiments, social-networking system 860 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 860 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 900. As an example and not by way of limitation, social-graph entities that are closer in the social graph 900 (i.e., fewer degrees of separation) may have a higher coefficient than entities that are further apart in the social graph 900.

In particular embodiments, social-networking system 860 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 830 of the user). A first user may be more interested in other users or concepts that are closer to the first user. As an example and not by way of limitation, if a user is one mile from an airport and two miles from a gas station, social-networking system 860 may determine that the user has a higher coefficient for the airport than the gas station based on the proximity of the airport to the user.

In particular embodiments, social-networking system 860 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 860 may provide information that is relevant to user's interests and current circumstances, increasing the likelihood that they will find such information of interest. In particular embodiments, social-networking system 860 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 860 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 860 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 870 (e.g., via an API or other communication channel), or from another suitable system. In response to the request, social-networking system 860 may calculate the coefficient (or access the coefficient information if it has previously been calculated and stored). In particular embodiments, social-networking system 860 may measure an affinity with respect to a particular process. Different processes (both internal and external to the online social network) may request a coefficient for a particular object or set of objects. Social-networking system 860 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 860 or shared with other systems (e.g., third-party system 870). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 870, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 862 may be authorization/privacy servers for enforcing privacy settings. In response to a request from a user (or other entity) for a particular object stored in a data store 864, social-networking system 860 may send a request to the data store 864 for the object. The request may identify the user associated with the request and may only be sent to the user (or a client system 830 of the user) if the authorization server determines that the user is authorized to access the object based on the privacy settings associated with the object. If the requesting user is not authorized to access the object, the authorization server may prevent the requested object from being retrieved from the data store 864, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 10:
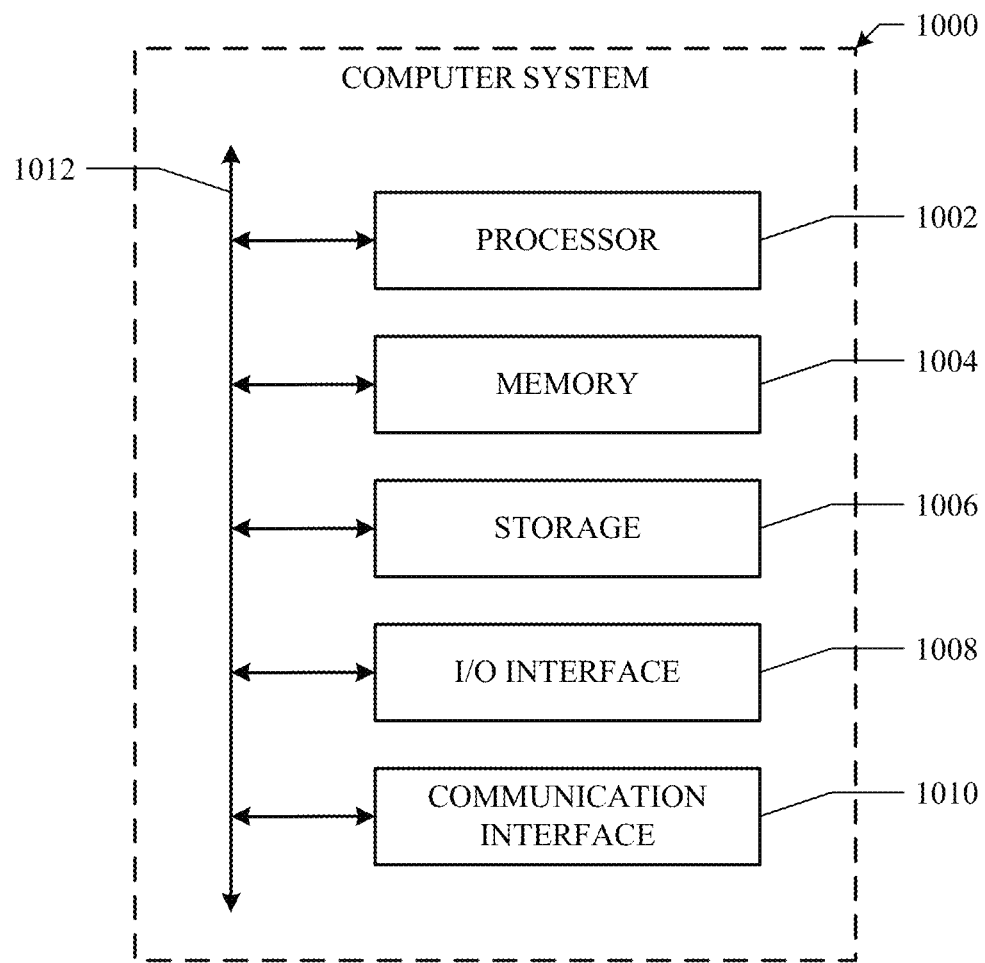
FIG. 10 illustrates an example computer system.

FIG. 10 illustrates an example computer system 1000. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
   receiving a plurality of input frames of a video sequence associated with a time t;
   predicting, using a convolutional network, one or more future frames of the video sequence from the plurality of input frames, wherein the convolutional network is trained with randomly selected temporal sequences of a n×m grid of pixels from the plurality of input frames exhibiting a threshold of optical flow; and
   outputting a first future frame of the video sequence associated with a time t+1 as predicted by the convolutional network.

2. The method of claim 1, further comprising by the one or more computing devices:
   predicting, using the convolutional network, a second future frame of the video sequence associated with time t+2 by using the first future frame as an input frame of the video sequence;
   recursively applying the convolutional network based on the first future frame; and
   outputting the second future frame of the video sequence associated with the time t+2 as predicted by the convolutional network.

3. The method of claim 1, wherein the threshold of optical flow is determined based on a comparison of movement in the n×m grid of pixels between a time t−1 and the time t.

4. The method of claim 3, wherein the comparison of movement comprises comparing pixel intensity associated with each pixel of the n×m grid of pixels between the time t−1 and the time t and calculating a similarity measure based on compared pixel intensities.

5. The method of claim 1, wherein the convolutional network is further trained by evaluating a quality of the predicted one or more future frames of the video sequence by calculating a peak-signal-to-noise ratio between the one or more future frames of the video sequence and a ground truth frame of the video sequence.

6. The method of claim 1, wherein the convolutional network is further trained by evaluating a quality of the predicted one or more future frames of the video sequence by calculating a structural similarity index measure between the one or more future frames of the video sequence and a ground truth frame of the video sequence.

7. The method of claim 1, wherein the convolutional network employs an $L_1$ loss to train the network on the input frames.

8. The method of claim 1, wherein the convolutional network employs an $L_2$ loss to train the network on the input frames.

9. The method of claim 1, wherein the convolutional network employs a gradient difference loss to train the network on the input frames.

10. One or more computer-readable non-transitory storage media embodying software that is operable when executed to:
    receive a plurality of input frames of a video sequence associated with a time t;
    predict, using a convolutional network, one or more future frames of the video sequence from the plurality of input frames, wherein the convolutional network is trained with randomly selected temporal sequences of a n×m grid of pixels from the plurality of input frames exhibiting a threshold of optical flow; and
    output a first future frame of the video sequence associated with a time t+1 as predicted by the convolutional network.

11. The media of claim 10, wherein threshold of optical flow is determined based on a comparison of movement in the n×m grid of pixels between a time t−1 and the time t.

12. The media of claim 11, wherein the comparison of movement comprises comparing pixel intensity associated with each pixel of the n×m grid of pixels between the time t−1 and the time t and calculating a similarity measure based on compared pixel intensities.

13. The media of claim 10, wherein the training of the convolutional network may further comprise evaluating a quality of the predicted one or more future frames of the video sequence by calculating a peak-signal-to-noise ratio between the one or more future frames of the video sequence and a ground truth frame of the video sequence.

14. The media of claim 10, wherein the training of the convolutional network may further comprise evaluating a quality of the predicted one or more future frames of the video sequence by calculating a structural similarity index measure between the one or more future frames of the video sequence and a ground truth frame of the video sequence.

15. A system comprising: one or more processors; and one or more computer-readable non-transitory storage media coupled to one or more of the processors and comprising instructions operable when executed by one or more of the processors to cause the system to:
- receive a plurality of input frames of a video sequence associated with a time t;
- predict, using a convolutional network, one or more future frames of the video sequence from the plurality of input frames, wherein the convolutional network is trained with randomly selected temporal sequences of a n×m grid of pixels from the plurality of input frames exhibiting a threshold of optical flow; and
- output a first future frame of the video sequence associated with a time t+1 as predicted by the convolutional network.

16. The system of claim 15, wherein the processors are further operable when executing the instructions to:
- predict a second future frame of the video sequence associated with time t+2 by using the first future frame as an input frame of the video sequence,
- recursively apply the generative model based on the first future frame, and
- outputting the second future frame of the video sequence associated with the time t+2 as predicted by the generative model.

17. The system of claim 15, wherein threshold of optical flow is determined based on a comparison of movement in the n×m grid of pixels between a time t−1 and the time t.

18. The system of claim 17, wherein the comparison of movement comprises comparing pixel intensity associated with each pixel of the n×m grid of pixels between the time t−1 and the time t and calculating a similarity measure based on compared pixel intensities.

19. The system of claim 15, wherein the training of the convolutional network may further comprise evaluating a quality of the predicted one or more future frames of the video sequence by calculating a peak-signal-to-noise ratio between the one or more future frames of the video sequence and a ground truth frame of the video sequence.

20. The system of claim 15, wherein the training of the convolutional network may further comprise evaluating a quality of the predicted one or more future frames of the video sequence by calculating a structural similarity index measure between the one or more future frames of the video sequence and a ground truth frame of the video sequence.

* * * * *